(12) United States Patent
Jiang et al.

(10) Patent No.: US 12,164,760 B2
(45) Date of Patent: Dec. 10, 2024

(54) METHOD AND APPARATUS FOR DYNAMICALLY DISPLAYING ICON BASED ON BACKGROUND IMAGE

(71) Applicant: Huawei Technologies Co., Ltd., Shenzhen (CN)

(72) Inventors: Hua Jiang, Nanjing (CN); Xiaofeng Zhu, Saint Petersburg (RU); Xiaoxiao Chen, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/330,640

(22) Filed: Jun. 7, 2023

(65) Prior Publication Data
US 2023/0393721 A1 Dec. 7, 2023

Related U.S. Application Data

(63) Continuation of application No. 16/765,282, filed as application No. PCT/CN2017/111948 on Nov. 20, 2017, now Pat. No. 11,714,533.

(51) Int. Cl.
*G06F 17/00* (2019.01)
*G06F 3/04817* (2022.01)
*G06F 3/04845* (2022.01)

(52) U.S. Cl.
CPC ...... *G06F 3/04845* (2013.01); *G06F 3/04817* (2013.01)

(58) Field of Classification Search
CPC .......................... G06F 3/04845; G06F 3/04817
See application file for complete search history.

(56) References Cited

U.S. PATENT DOCUMENTS

| 8,266,550 | B1 | 9/2012 | Cleron et al. |
| 8,345,061 | B1* | 1/2013 | Landry ............... G06T 11/001 |
| | | | 715/275 |
| 8,839,106 | B2 | 9/2014 | Lee et al. |
| 9,158,792 | B2 | 10/2015 | Yu et al. |
| 9,921,714 | B1 | 3/2018 | Shapiro et al. |

(Continued)

FOREIGN PATENT DOCUMENTS

| CN | 101916168 A | 12/2010 |
| CN | 103677516 A | 3/2014 |

(Continued)

*Primary Examiner* — Mohammed H Zuberi
(74) *Attorney, Agent, or Firm* — Conley Rose, P.C.

(57) ABSTRACT

A background image displayed by a terminal includes a first region presenting a first image effect and a second region presenting a second image effect. The terminal may superimpose and display an icon display element in the first region, and when superimposing and displaying the icon in the first region, the terminal is permitted to present the icon as a first display effect associated with the first image effect. Further, when the terminal receives an operation of moving the icon by a user, the terminal is permitted to move, in response to the operation, the icon display element to the second region that presents the second image effect, for superimposing and displaying. In this case, the icon automatically presents, in the second region, a second display effect associated with the second image effect. In this way, interactive displaying of the background image and the icon is implemented.

20 Claims, 30 Drawing Sheets

(56) References Cited

U.S. PATENT DOCUMENTS

| | | |
|---|---|---|
| 10,319,338 B2 * | 6/2019 | Lee .................. G09G 3/2003 |
| 10,630,806 B2 | 4/2020 | Liu et al. |
| 2003/0182139 A1 | 9/2003 | Harris et al. |
| 2005/0086265 A1 | 4/2005 | Sato |
| 2005/0207430 A1 | 9/2005 | Yamada |
| 2006/0224620 A1 | 10/2006 | Silverman et al. |
| 2006/0230331 A1 | 10/2006 | Abanami et al. |
| 2007/0083471 A1 | 4/2007 | Robbin et al. |
| 2007/0128899 A1 | 6/2007 | Mayer |
| 2007/0171286 A1 | 7/2007 | Ishii et al. |
| 2007/0233740 A1 | 10/2007 | Nichols et al. |
| 2007/0299806 A1 | 12/2007 | Bardsley et al. |
| 2008/0147726 A1 | 6/2008 | Hwang et al. |
| 2008/0207188 A1 | 8/2008 | Ahn et al. |
| 2009/0289924 A1 | 11/2009 | Takata |
| 2011/0202872 A1 | 8/2011 | Park |
| 2011/0238688 A1 * | 9/2011 | Mercuri ................ G06F 16/958 707/769 |
| 2011/0312387 A1 | 12/2011 | Heo et al. |
| 2012/0023425 A1 | 1/2012 | Hackborn et al. |
| 2012/0071208 A1 | 3/2012 | Lee et al. |
| 2012/0084730 A1 | 4/2012 | Noma et al. |
| 2012/0124515 A1 * | 5/2012 | Li ........................ G06F 3/0482 715/808 |
| 2012/0127198 A1 * | 5/2012 | Gundavarapu .......... G09G 5/00 345/629 |
| 2012/0262488 A1 | 10/2012 | Liu et al. |
| 2013/0024814 A1 | 1/2013 | Kim et al. |
| 2013/0067027 A1 | 3/2013 | Song et al. |
| 2013/0135228 A1 | 5/2013 | Won et al. |
| 2013/0198176 A1 | 8/2013 | Kim |
| 2013/0305189 A1 | 11/2013 | Kim |
| 2014/0123003 A1 | 5/2014 | Song |
| 2014/0232739 A1 | 8/2014 | Kim et al. |
| 2015/0029206 A1 | 1/2015 | Bialota |
| 2015/0042852 A1 | 2/2015 | Lee et al. |
| 2015/0074576 A1 | 3/2015 | Ma |
| 2015/0179134 A1 | 6/2015 | Kuo |
| 2015/0186610 A1 | 7/2015 | Sansale et al. |
| 2015/0205450 A1 | 7/2015 | Howett |
| 2015/0242374 A1 | 8/2015 | Kong et al. |
| 2015/0363958 A1 | 12/2015 | Zhu et al. |
| 2016/0077711 A1 | 3/2016 | Jung et al. |
| 2016/0147792 A1 | 5/2016 | Oh et al. |
| 2016/0154536 A1 | 6/2016 | Kim et al. |
| 2016/0180172 A1 | 6/2016 | Yonaha |
| 2016/0196806 A1 | 7/2016 | Lee et al. |
| 2016/0232686 A1 | 8/2016 | Park et al. |
| 2016/0274748 A1 | 9/2016 | Feng |
| 2016/0274776 A1 | 9/2016 | Scheff |
| 2016/0337593 A1 | 11/2016 | Guo |
| 2016/0352971 A1 | 12/2016 | Kanematsu |
| 2017/0032187 A1 | 2/2017 | Saito |
| 2017/0054788 A1 | 2/2017 | Liu et al. |
| 2017/0109891 A1 | 4/2017 | Mosher et al. |
| 2017/0123603 A1 | 5/2017 | Chang |
| 2017/0131868 A1 | 5/2017 | Hu |
| 2017/0148191 A1 | 5/2017 | Huang |
| 2017/0354019 A1 | 12/2017 | Julian et al. |
| 2017/0365103 A1 | 12/2017 | Nijlunsing et al. |
| 2018/0137630 A1 | 5/2018 | Ma et al. |
| 2019/0129520 A1 * | 5/2019 | Shin ........................ G06T 7/00 |
| 2020/0241732 A1 | 7/2020 | Lu et al. |
| 2020/0394481 A1 * | 12/2020 | Brandt ............... G06K 19/0614 |

FOREIGN PATENT DOCUMENTS

| | | |
|---|---|---|
| CN | 104850307 A | 8/2015 |
| CN | 105183272 A | 12/2015 |
| CN | 105247512 A | 1/2016 |
| CN | 105320391 A | 2/2016 |
| CN | 106020612 A | 10/2016 |
| CN | 106095407 A | 11/2016 |
| CN | 106569678 A | 4/2017 |
| CN | 106851003 A | 6/2017 |
| CN | 106873855 A | 6/2017 |
| IN | 104636045 A | 5/2015 |
| WO | 2017100341 A1 | 6/2017 |

* cited by examiner

METHOD AND APPARATUS FOR DYNAMICALLY DISPLAYING ICON BASED ON BACKGROUND IMAGE

CROSS-REFERENCE TO RELATED APPLICATIONS

This is a continuation of U.S. patent application Ser. No. 16/765,282 filed on May 19, 2020, which is a National Stage Entry of International Patent Application No. PCT/CN2017/111948 filed on Nov. 20, 2017. The aforementioned patent applications are hereby incorporated by reference in their entireties.

TECHNICAL FIELD

Embodiments of this application relate to the field of communications technologies, and in particular, to an image displaying method and apparatus.

BACKGROUND

Currently, an electronic device such as a mobile phone may provide a user with increasingly rich visual output effects. For example, a superimposition and display scenario in which another display element is superimposed and displayed in a reference image (or interface) appears when there is a lot of display content. For example, time information is superimposed and displayed in a lock screen image set by the user, an icon of an application is superimposed and displayed on a desktop wallpaper, and a special emotion effect is added to a photograph.

Generally, specific parameters such as the content, position, and color of the display element superimposed and displayed are set when the mobile phone (or application) is released. However, for different reference images or different application scenarios, the user usually has different display requirements on the display element. This undoubtedly reduces display efficiency of the mobile phone and cannot satisfy personalized requirements of the user on the display element.

SUMMARY

Embodiments of this application provide an image displaying method and apparatus to implement intelligent control on a display element in a superimposition and display scenario and improve display efficiency of a terminal.

To achieve the foregoing objective, the embodiments of this application provide the following technical solutions, which may be applied to a superimposition and display scenario in which a terminal needs to superimpose and display one or more display elements in a reference image. The terminal may select, on the reference image based on an association relationship between the reference image and the display element, an appropriate display effect such as a position, a size, and a color with a relatively small visual conflict, to superimpose and display the display element, so that both the reference image and the display element superimposed on the reference image can achieve relatively good display effects.

The superimposition and display scenario may be specifically a scenario in which display elements are superimposed and displayed on different reference images when the reference image changes, or may be a scenario in which display elements are superimposed and displayed in different positions on a same reference image. This is not limited in the embodiments of this application.

According to a first aspect, an embodiment of this application provides an image displaying method. The image includes a first region presenting a first image effect and a second region presenting a second image effect (the first image effect is different from the second image effect). When the terminal superimposes and displays a display element in the first region, the display element may automatically present a first display effect associated with the first image effect. Subsequently, when the terminal receives an operation of a user on the display element, the terminal may move the display element to the second region for superimposing and displaying. In this case, the display element may automatically present a second display effect associated with the second image effect. To be specific, when the superimposed display element moves to a position, a display effect associated with an image effect in the position is automatically presented, so that effects of the display element and its background image can be interactive. In this way, interactive display effects of the display element and the background image are achieved, and it is ensured that both the display element and the background image achieve relatively good display effects.

In a possible design method, the image may be specifically a wallpaper of the terminal in a screen-locked state or a screen-unlocked state, or the image may be a specific display interface of an application.

In a possible design method, the image may be a wallpaper of the terminal in the screen-unlocked state, and the display element superimposed and displayed on the wallpaper may be at least one of a text, an icon, a picture, a suspend button, and a window component.

For example, when the display element is an icon of an application, a contrast between the icon and an image in the first region of the background image is greater than a threshold; and a contrast between the icon and an image in the second region is also greater than the threshold. To be specific, when the icon is superimposed and displayed in different regions of the background image, the terminal may highlight the application icon by adjusting the contrast display effect. This provides the user with a display effect more compliant with human vision, and may help the user quickly lock a required application icon on the wallpaper.

In a possible design method, the operation may be specifically a sliding operation; and that the terminal moves the display element to the second region of the image for superimposing and displaying specifically includes: the terminal moves the icon from the first region to the second region along a sliding track of the sliding operation, where the icon transitions from the first display effect to the second display effect in the moving process, so that a relatively gentle transition is presented when the icon changes the display effect.

For example, in the process of moving the icon, when a first part of the icon is located in the first region, and a second part of the icon is located in the second region, the terminal may display the first part of the icon as the first display effect that matches the first region, and display the second part of the icon as the second display effect that matches the second region.

In a possible design method, for example, the display element is a window component; in this case, the operation may be specifically a sliding operation; and that the terminal moves the display element to the second region for superimposing and displaying specifically includes: the terminal moves the window component from the first region to the second region along a sliding track of the sliding operation.

Alternatively, when the operation is a tapping operation, that the terminal moves the display element to the second region for superimposing and displaying specifically includes: the terminal first determines a location of the second region in the image, and further superimposes and displays the display element in the second region.

In a possible design method, the image may be specifically a display interface of an application, and the display element that is superimposed and displayed may be specifically at least one of a text, an icon, a picture, and a special display effect.

For example, in an example in which the image is a chat background in an instant messaging application, the superimposed display element may be a chat bubble carrying chat information, and the operation entered by the user may be specifically an operation of entering the chat information.

In this case, to prevent the chat bubble from blocking some display elements in the chat background, the second display effect of break-line displaying may be presented when the chat bubble is superimposed and displayed in the second region, so that the display effect of the chat bubble does not conflict with the display element in the chat background.

In a possible design method, when at least one of a type, a position, a size, a color, a luminance, a contrast, a special effect, and display content of the display element in the second display effect is different from that in the first display effect of the first region, it may be considered that the second display effect is different from the first display effect.

In a possible design method, the display effect of the display element may change in real time in the process in which the terminal moves the display element to the second region for superimposing and displaying.

In a possible design method, the first region and the second region are two different regions other than a third region in the image, and the third region is a region that includes a human face, or whose contrast is greater than a first preset value, or whose quantity of contour lines is greater than a second preset value in the image. To be specific, the third region is a region of higher interest to the user in the background image. In this case, the display element is displayed in the regions other than the third region to prevent the display element from blocking the third region of higher interest to the user in the background image and also prevent a background of the display element from interfering with the display effect of the display element.

In a possible design method, the second display effect of the display element in the second region may be further associated with display content in the third region of higher interest to the user, to provide the user with substitutive interactive scene experience.

According to a second aspect, an embodiment of this application provides a terminal, including a display unit, configured to display an image, where the image includes a first region and a second region, the first region presents a first image effect, the second region presents a second image effect different from the first image effect, a display element is superimposed and displayed in the first region, and the display element presents a first display effect associated with the first image effect; an obtaining unit, configured to receive an operation of a user on the display element; and a responding unit, configured to move, by the terminal in response to the operation, the display element to the second region for superimposing and displaying, where the display element automatically presents a second display effect associated with the second image effect, and the first image effect and the second image effect are different.

In a possible design method, the image is a wallpaper of the terminal in a screen-locked state or a screen-unlocked state, or the image is a display interface of an application.

In a possible design method, the image is a wallpaper of the terminal in the screen-unlocked state, and the display element includes at least one of a text, an icon, a picture, a suspend button, and a window component.

In a possible design method, when the display element is an icon, a contrast between the icon and an image in the first region is greater than a threshold; and a contrast between the icon and an image in the second region is greater than the threshold.

In a possible design method, the operation is a sliding operation; and the responding unit is specifically configured to move the icon from the first region to the second region along a sliding track of the sliding operation, where the icon transitions from the first display effect to the second display effect in the moving process.

In a possible design method, when a first part of the icon is located in the first region, and a second part of the icon is located in the second region, the first part of the icon presents the first display effect, and the second part of the icon presents the second display effect.

In a possible design method, the display element is a window component, and the operation is a sliding operation; and the responding unit is specifically configured to move the window component from the first region to the second region along a sliding track of the sliding operation.

In a possible design method, the display element is a window component, and the operation is a sliding operation; and the responding unit is specifically configured to determine a location of the second region in the image, and display and superimpose, by the terminal, the display element in the second region.

In a possible design method, the image is a display interface of a first application, and the display element includes at least one of a text, an icon, a picture, and a special display effect.

In a possible design method, the image is a chat background in an instant messaging application, the display element is a chat bubble carrying chat information, and the operation is an operation of entering the chat information.

In a possible design method, the chat bubble presents the second display effect of break-line displaying in the second region.

In a possible design method, at least one of a type, a position, a size, a color, a luminance, a contrast, a special effect, and display content of the display element in the second display effect is different from that in the first display effect.

In a possible design method, the responding unit is specifically configured to move, in real time in response to the operation, the display element to the second region for superimposing and displaying.

In a possible design method, the first region and the second region are two different regions other than a third region in the image, and the third region is a region that includes a human face, or whose contrast is greater than a first preset value, or whose quantity of contour lines is greater than a second preset value in the image.

In a possible design method, the second display effect is further associated with display content in the third region.

According to a third aspect, an embodiment of this application provides a terminal, including a processor, a memory, a display, a bus, and a communications interface, where the memory is configured to store a computer-executable instruction, the processor is connected to the memory by using the bus, and when the terminal runs, the processor executes the computer-executable instruction stored in the memory, so that the terminal performs any one of the foregoing image displaying methods.

According to a fourth aspect, an embodiment of this application provides a graphical user interface (GUI), including:

A terminal includes a display, a memory, a plurality of application programs, and one or more processors configured to execute one or more programs stored in the memory, and the graphical user interface includes a user interface displayed according to any one of the foregoing panoramic photographing methods.

The graphical user interface is stored in the terminal. The terminal includes a display, a memory, and one or more processors, where the one or more processors are configured to execute one or more computer programs stored in the memory. The graphical user interface includes a first GUI displayed on the display, where the first GUI includes a first region and a second region of an image, the first region presents a first image effect, the second region presents a second image effect different from the first image effect, a display element is superimposed and displayed in the first region, and the display element presents a first display effect associated with the first image effect; and a second GUI displayed on the touchscreen, where the second GUI includes the display element superimposed and displayed in the second region, the display element automatically presents a second display effect associated with the second image effect, and the first image effect and the second image effect are different.

According to a fifth aspect, an embodiment of this application provides a computer-readable storage medium, where the computer-readable storage medium stores an instruction, and when the instruction is run on any one of the foregoing terminals, the terminal is enabled to perform any one of the foregoing image displaying methods.

According to a sixth aspect, an embodiment of this application provides a computer program product including an instruction, where when the computer program product is run on any one of the foregoing terminals, the terminal is enabled to perform any one of the foregoing image displaying methods.

For a technical effect brought by any design mode in the second aspect to the sixth aspect, refer to technical effects brought by different design methods in the first aspect. Details are not described again herein.

DESCRIPTION OF EMBODIMENTS

The following terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the description of the embodiment of this application, unless otherwise stated, "multiple" means two or more than two.

An image method provided by an embodiment of this application may be applied to any terminal having a display function, for example, a mobile phone, a wearable device, an augmented reality (augmented reality, AR) or virtual reality (virtual reality, VR) device, a tablet computer, a notebook computer, an ultra-mobile personal computer (ultra-mobile personal computer, UMPC), a netbook, or a personal digital assistant (personal digital assistant, PDA). Certainly, a specific form of the terminal is not limited.

Figure 1:
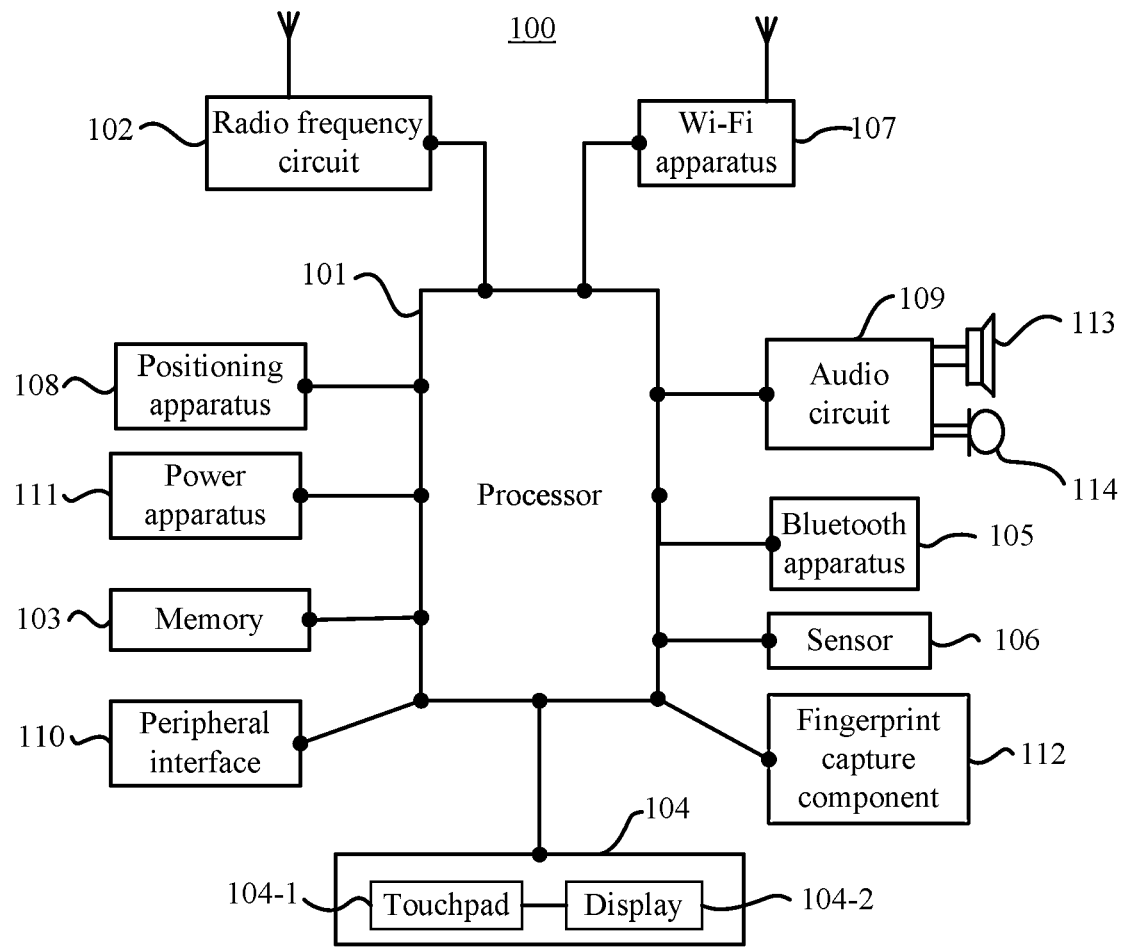
FIG. 1 is a schematic structural diagram 1 of a terminal according to an embodiment of this application.

As shown in FIG. 1, the terminal in this embodiment of this application may be a mobile phone 100. The following describes this embodiment in detail by using the mobile phone 100 as an example. It should be understood that, the mobile phone 100 shown in the figure is only an example of the terminal. In addition, a quantity of components of the mobile phone 100 may be greater than or less than that shown in the figure, two or more components may be combined, or different components may be configured.

As shown in FIG. 1, the mobile phone 100 may specifically include components such as a processor 101, a radio frequency (radio frequency, RF) circuit 102, a memory 103, a touchscreen 104, a Bluetooth apparatus 105, one or more sensors 106, a Wireless Fidelity (Wireless Fidelity, Wi-Fi) apparatus 107, a positioning apparatus 108, an audio circuit 109, a peripheral interface 110, and a power system 111. The components may perform communication by using one or more communications buses or signal cables (not shown in FIG. 1). A person skilled in the art may understand that, a hardware structure shown in FIG. 1 does not constitute a limitation on the mobile phone. A quantity of components included in the mobile phone 100 may be greater or less than that shown in the figure, or some components are combined, or component arrangements are different.

The following describes each component of the mobile phone 100 in detail with reference to FIG. 1.

The processor 101 is a control center of the mobile phone 100. The processor 101 is connected to all parts of the mobile phone 100 by using various interfaces and lines, and executes various functions and data processing of the mobile phone 100 by running or executing an application program stored in the memory 103 and invoking data stored in the memory 103. In some embodiments, the processor 101 may include one or more processing units. For example, the processor 101 may be a Kirin 960 chip manufactured by Huawei Technologies Co., Ltd. In some embodiments of this application, the processor 101 may further include a fingerprint verification chip, configured to verify a captured fingerprint.

The radio frequency circuit 102 may be configured to receive and send radio signals in an information receiving/sending or call process. Particularly, after receiving downlink data from a base station, the radio frequency circuit 102 may send the downlink data to the processor 101 for processing, and send uplink data to the base station. Generally, the radio frequency circuit includes but is not limited to an antenna, at least one amplifier, a transceiver, a coupler, a low noise amplifier, a duplexer, or the like. In addition, the radio frequency circuit 102 may further communicate with another device through wireless communication. The wireless communication may use any communication standard or protocol, including but not limited to the global system for mobile communications, general packet radio service, code division multiple access, wideband code division multiple access, long term evolution, e-mail, short message service, or the like.

The memory 103 is configured to store the application program and data. The processor 101 executes various functions and data processing of the mobile phone 100 by running the application program and data stored in the memory 103. The memory 103 mainly includes a program storage area and a data storage area. The program storage area may store an operating system, an application program required by at least one function (such as an audio playing function or an image playing function). The data storage area may store data (such as audio data or a phone book) that is created according to usage of the mobile phone 100. In addition, the memory 103 may include a high-speed random access memory (random access memory, RAM), and may further include a non-volatile memory, for example, a magnetic disk storage device, a flash memory, or another volatile solid-state storage device. The memory 103 may store various operating systems, for example, an iOS® operating system developed by Apple Inc. or an Android® operating system developed by Google Inc. The memory 103 may be independent, and is connected to the processor 101 by using the communications bus; or the memory 103 may be integrated with the processor 101.

The touchscreen 104 may specifically include a touchpad 104-1 and a display 104-2.

The touchpad 104-1 may capture a touch event of a user of the mobile phone 100 on or near the touchpad (for example, an operation performed by the user by using any appropriate object such as a finger or a stylus on the touchpad 104-1 or near the touchpad 104-1), and send captured touch information to another component (for example, the processor 101). The touch event of the user near the touchpad 104-1 may be referred to as a floating touch. The floating touch may be that the user does not need to directly touch the touchpad for selecting, moving, or dragging an object (for example, an icon), and that the user only needs to be located near the terminal for ease of performing a required function. In addition, the touchpad 104-1 may be implemented by using a plurality of types such as resistive, capacitive, infrared, and surface acoustic wave.

The display (also referred to as a display screen) 104-2 may be configured to display information input by the user or information provided for the user and various menus of the mobile phone 100. The display 104-2 may be configured in a form of a liquid crystal display, an organic light-emitting diode, or the like. The touchpad 104-1 may cover the display 104-2. After detecting the touch event on or near the touchpad 104-1, the touchpad 104-1 transmits the touch event to the processor 101 to determine a type of the touch event. Then the processor 101 may provide a corresponding visual output on the display 104-2 based on the type of the touch event. Although the touchpad 104-1 and the display screen 104-2 are used as two independent components to implement input and output functions of the mobile phone 100 in FIG. 1, the touchpad 104-1 and the display screen 104-2 may be integrated to implement the input and output functions of the mobile phone 100 in some embodiments.

It may be understood that, the touchscreen 104 may be formed by a plurality of stacked layers of materials. Only the touchpad (layer) and the display screen (layer) are presented in this embodiment of this application. Other layers are not described in this embodiment of this application. In addition, the touchpad 104-1 may be configured on a front side of the mobile phone 100 in a form of a complete panel, and the display screen 104-2 may also be configured on the front side of the mobile phone 100 in a form of a complete panel. Therefore, a bezel-less structure can be implemented for the front side of the mobile phone.

The mobile phone 100 may further include the Bluetooth apparatus 105, configured to implement data exchange between the mobile phone 100 and another short-range terminal (for example, a mobile phone or a smartwatch). The Bluetooth apparatus in this embodiment of this application may be an integrated circuit, a Bluetooth chip, or the like.

The mobile phone 100 may further include at least one sensor 106, for example, a fingerprint capture component 112, a light sensor, a motion sensor, and other sensors. Specifically, the fingerprint capture component 112 may be configured on a rear side (for example, below a rear camera)

of the mobile phone 100, or the fingerprint capture component 112 is configured on the front side (for example, below the touchscreen 104) of the mobile phone 100. For another example, the fingerprint capture component 112 may be configured in the touchscreen 104 to implement a fingerprint recognition function. To be specific, the fingerprint capture component 112 and the touchscreen 104 may be integrated to implement a fingerprint recognition function of the mobile phone 100. The light sensor may include an ambient light sensor and a proximity sensor. The ambient light sensor may adjust luminance of the display of the touchscreen 104 based on brightness of ambient light. The proximity sensor may turn off the display when the mobile phone 100 moves to an ear. As a type of motion sensor, an accelerometer sensor may detect acceleration magnitudes in all directions (generally tri-axis), and when the accelerometer sensor is stationary, may detect a magnitude and a direction of gravity, and may be used in a posture recognition application of the mobile phone (for example, switching between landscape orientation and portrait orientation, a related game, or magnetometer posture calibration), a function related to vibration recognition (for example, a pedometer or a stroke), or the like. For other sensors that may be configured for the mobile phone 100, such as a gyroscope, a barometer, a hygrometer, a thermometer, and an infrared sensor, details are not described herein.

The Wi-Fi apparatus 107 is configured to provide network access complying with a Wi-Fi related standard protocol for the mobile phone 100. By using the Wi-Fi apparatus 107, the mobile phone 100 may access a Wi-Fi access point, and further help the user send and receive e-mails, browse web pages, access streaming media, and the like. The Wi-Fi apparatus 107 provides wireless broadband Internet access for the user. In other embodiments, the Wi-Fi apparatus 107 may also be used as a Wi-Fi wireless access point, and may provide Wi-Fi network access for another terminal.

The positioning apparatus 108 is configured to provide a geographic location for the mobile phone 100. It may be understood that, the positioning apparatus 108 may be specifically a receiver of a positioning system such as a global positioning system (global positioning system, GPS), a BeiDou satellite navigation system, or Russian GLONASS. After receiving the geographic location sent by the positioning system, the positioning apparatus 108 sends the information to the processor 101 for processing, or sends the information to the memory 103 for storage. Alternatively, in other embodiments, the positioning apparatus 108 may be a receiver of an assisted global positioning system (assisted global positioning system, AGPS). The AGPS system, as an assistance server, assists the positioning apparatus 108 in completing ranging and positioning services. In this case, the positioning assistance server communicates with the positioning apparatus 108 (that is, a GPS receiver) of a terminal such as the mobile phone 100 to provide positioning assistance. Alternatively, in other embodiments, the positioning apparatus 108 may be a positioning technology based on a Wi-Fi access point. Because each Wi-Fi access point has a globally unique media access control (media access control, MAC) address, the terminal may scan and capture broadcast signals of nearby Wi-Fi access points when Wi-Fi is enabled, and therefore can obtain MAC addresses broadcast by the Wi-Fi access points; the terminal sends, to a location server by using a wireless communications network, data (for example, the MAC addresses) that can identify the Wi-Fi access points; and the location server retrieves a geographic location of each Wi-Fi access point, calculates the geographic location of the terminal with reference to strength of the Wi-Fi broadcast signals, and sends the geographic location of the terminal to the positioning apparatus 108 of the terminal.

The audio circuit 109, a speaker 113, and a microphone 114 may provide an audio interface between the user and the mobile phone 100. The audio circuit 109 may convert received audio data into an electrical signal and then transmit the electrical signal to the speaker 113, and the speaker 113 converts the electrical signal into an audio signal for outputting. On the other hand, the microphone 114 converts a captured audio signal into an electrical signal, and the audio circuit 109 converts the received electrical signal into audio data and then outputs the audio data to the RF circuit 102; and then the audio data is transmitted, for example, to another mobile phone, or the audio data is output to the memory 103 for further processing.

The peripheral interface 110 is configured to provide various interfaces for external input/output devices (for example, a keyboard, a mouse, an external display, an external memory, and a subscriber identity module card). For example, the peripheral interface is connected to the mouse by using a universal serial bus (universal serial bus, USB) interface, or connected, by using a metal contact in a subscriber identity module card slot, to a subscriber identity module (subscriber identification module, SIM) card provided by a telecommunications operator. The peripheral interface 110 may be configured to couple the external input/output peripheral device to the processor 101 and the memory 103.

The mobile phone 100 may further include the power apparatus 111 (such as a battery and a power management chip) supplying power to each component. The battery may be logically connected to the processor 101 by using the power management chip, so that functions such as charge and discharge management and power consumption management are implemented by using the power apparatus 111.

Although not shown in FIG. 1, the mobile phone 100 may further include a camera (a front camera and/or a rear camera), a flash, a micro projection apparatus, a near field communications (near field communications, NFC) apparatus, and the like. Details are not described herein.

In an image displaying method provided by this application, when a terminal needs to superimpose and display one or more display elements on a reference image, the terminal may select appropriate display parameters such as a display position and a display form on the reference image for the display element by using a related image recognition algorithm based on an association between the reference image and a display element that needs to be subsequently superimposed and displayed, so that both the reference image and the display element superimposed on the reference image can achieve relatively good display effects. In this way, interactive displaying of the reference image and the superimposed display element is implemented. The reference image may be an image displayed under the display element that is superimposed and displayed.

The reference image may be specifically at least one of a wallpaper, a photo, an application interface, and a video picture, and the display element may be specifically at least one of a text, an icon, a picture, a suspend button, a special display effect, and a window component. When the terminal superimposes and displays the display element on the reference image, the display element may cover a part of regions of the reference image in a completely transparent form, or may cover a part of regions of the reference image in a semi-transparent or transparent form. After a display element is superimposed and displayed on the reference image, the terminal may consider the display element as a part of the reference image. In this case, other display elements may continue to be superimposed and displayed on the reference image.

Figure 2:
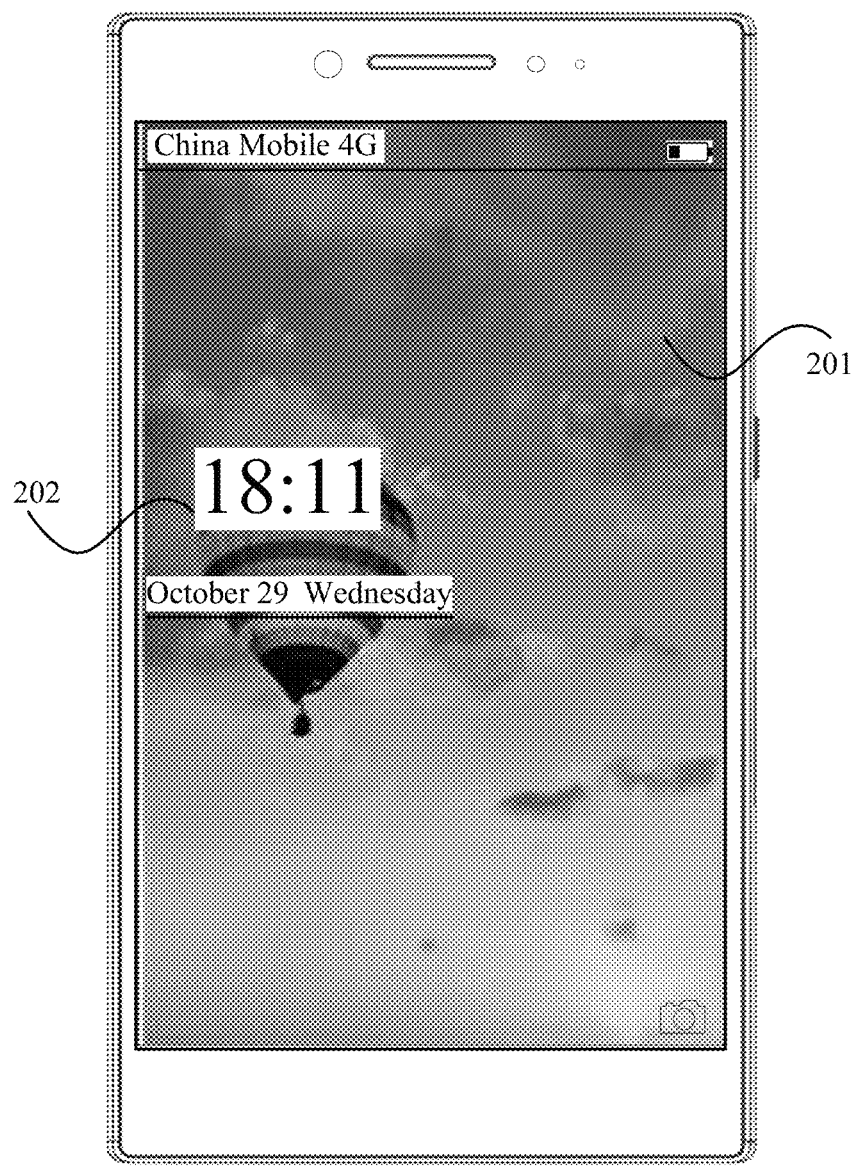
FIG. 2 is a schematic scenario diagram of superimposing and displaying a text on a lock screen wallpaper in the prior art.

In some embodiments of this application, the association between the reference image and the superimposed display element may be relatively weak. For example, as shown in FIG. 2, the reference image is a lock screen wallpaper 201 defined by a user, and the display element on the reference image 201 is a text 202 for displaying time information. There is no direct association relationship between the text 202 and the lock screen wallpaper 201. However, currently when the terminal lays out the text 202 on the lock screen wallpaper 201, the text 202 of a fixed size and color is generally displayed in a preset position without considering specific content of the lock screen wallpaper 201.

In this case, the text 202 may be laid out in a significant region that can attract the user's visual focus on the lock screen wallpaper 201, for example, a location of a hot air balloon on the lock screen wallpaper 201 shown in FIG. 2. Generally, the significant region is usually a region having a relatively obvious portrait contrast or having an obvious contour line. Laying out the text 202 in the significant region of the lock screen wallpaper 201 may cause blocking of important information on the lock screen wallpaper 201, and also cause interference to a display effect of the text 202.

In view of this, in some embodiments of this application, when a display element having a weak association with the reference image needs to be superimposed and displayed, the terminal may first determine, by using a related image recognition algorithm, a significant region of higher interest to human vision in the reference image. In this case, any region other than the significant region in the reference image may be used as an insignificant region of lower interest to human vision. Further, the terminal may display the display element in the insignificant region. In this way, both the superimposed display element and the significant region of interest to the user in the reference image can be highlighted to achieve relatively good superimposition and display effects.

Still in the example in which the text 202 is superimposed and displayed on the lock screen wallpaper 201, the terminal may first obtain image feature information of the lock screen wallpaper 201, for example, extract a pixel matrix formed by information of each pixel in the lock screen wallpaper 201, and use the pixel matrix as the image feature information of the lock screen wallpaper 201; or extract a color channel (for example, color channels of three primary colors red, green, and blue) in the lock screen wallpaper 201, and use the extracted color channels as the image feature information of the lock screen wallpaper 201, or the like. A specific method for obtaining the image feature information is not limited in this embodiment of this application.

In this case, based on the obtained image feature information, the terminal may detect a specific location of the significant region in the lock screen wallpaper 201 by using a preset detection algorithm. The detection algorithm may be specifically a face recognition algorithm, an edge detection algorithm, an Itti algorithm (a selective attention algorithm simulating a visual attention mechanism of an organism, an LC (luminance contrast) algorithm, or a GC (global contrast) algorithm, or the like. This is not limited in this embodiment of this application.

Figure 3:
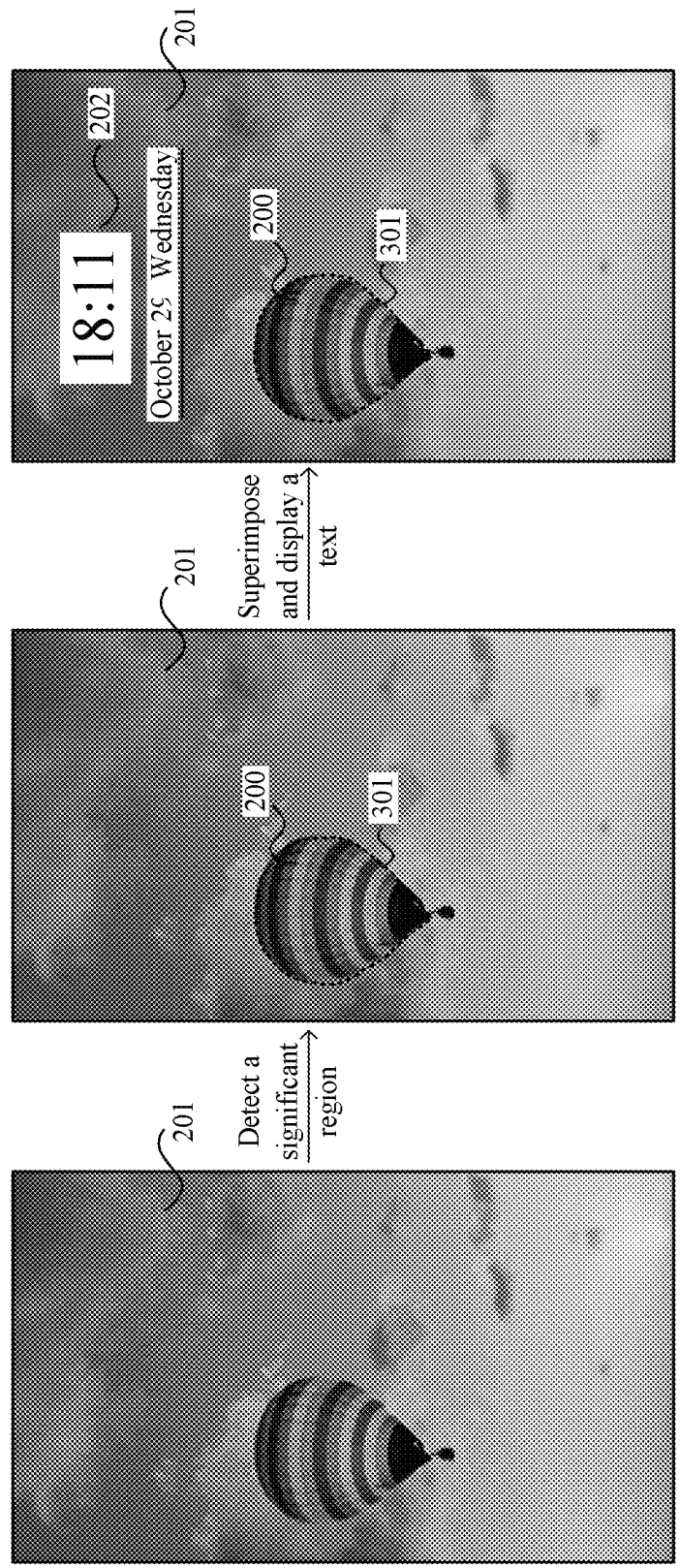
FIG. 3 is a schematic diagram 1 of an image method according to an embodiment of this application.

Generally, the detected significant region is usually a region that includes a human face, or whose contrast is relatively high, or whose contour lines are relatively obvious. As shown in FIG. 3, based on the image feature information of the lock screen wallpaper 201, a significant region 301 on the lock screen wallpaper 201 may be extracted as a region that displays a hot air balloon 200 and whose contrast is greater than a threshold.

To be specific, a point of interest to user vision on the lock screen wallpaper 201 is located in the significant region 301, but there is no direct association between the superimposed text 202 and image content in the significant region. Therefore, in any insignificant region other than the significant region 301, the terminal may display the text 202 having a relatively weak association with the lock screen wallpaper 201. This avoids a visual conflict between the text 202 and the significant region 301 of the lock screen wallpaper 201.

Figure 4A:
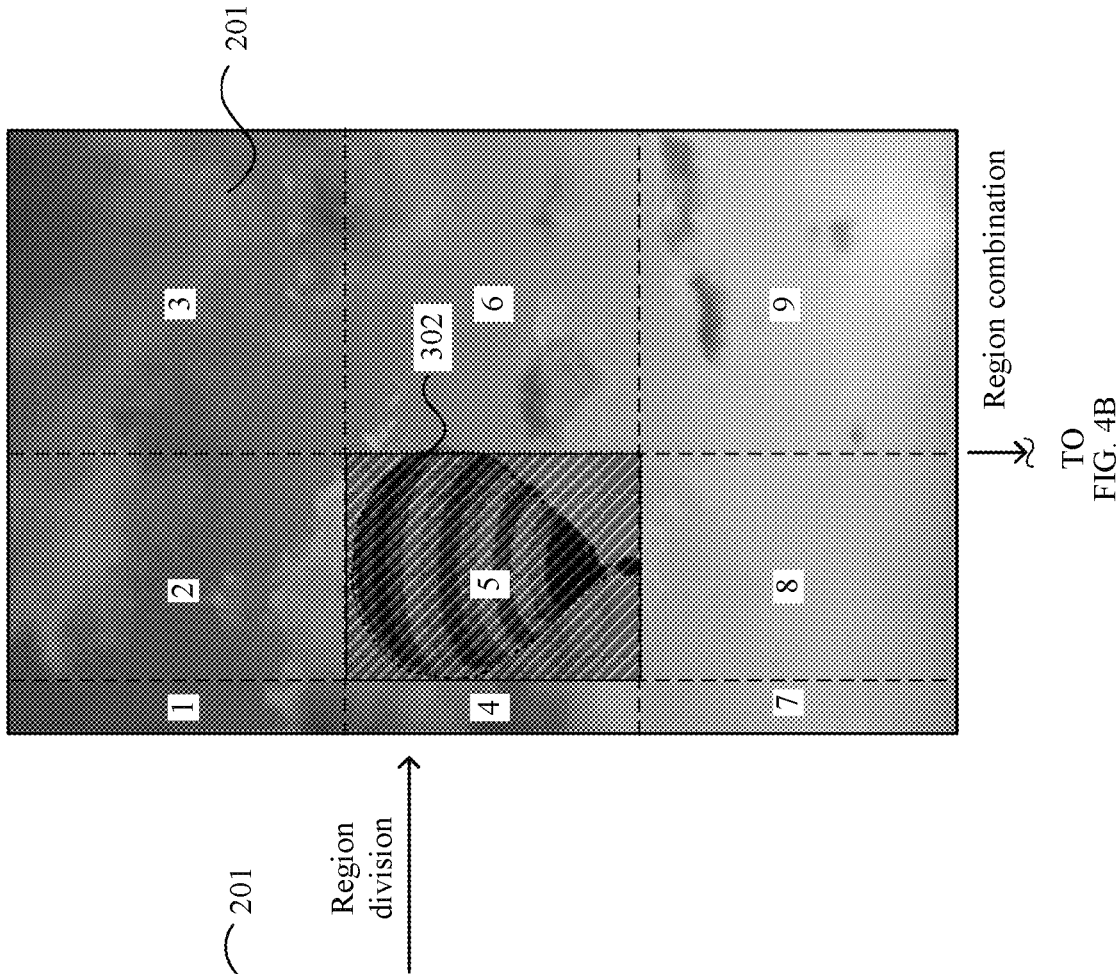
FIG. 4A and FIG. 4B are a schematic diagram 2 of an image method according to an embodiment of this application.
Figure 4A:
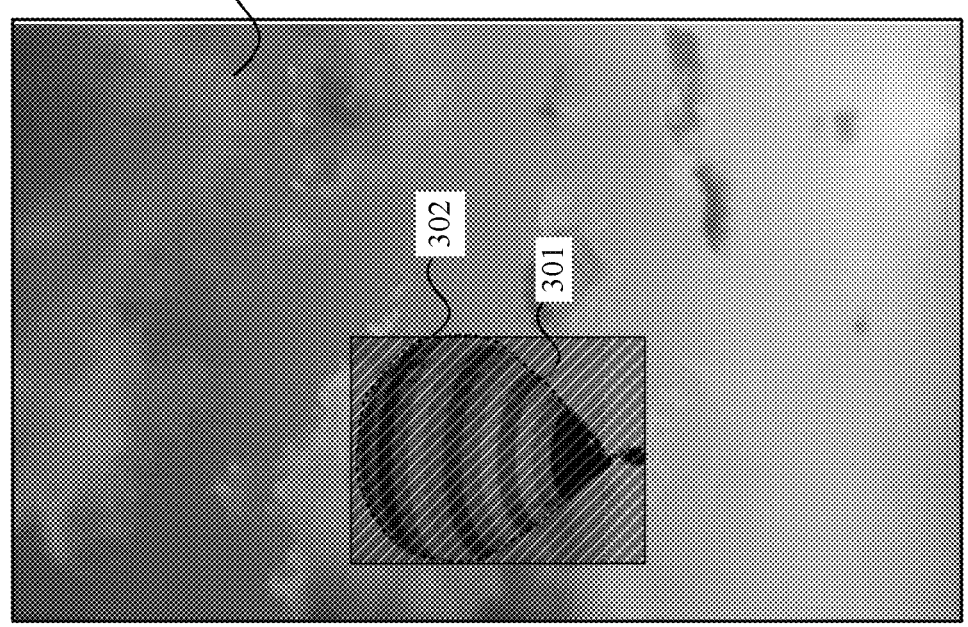
Figure 4B:
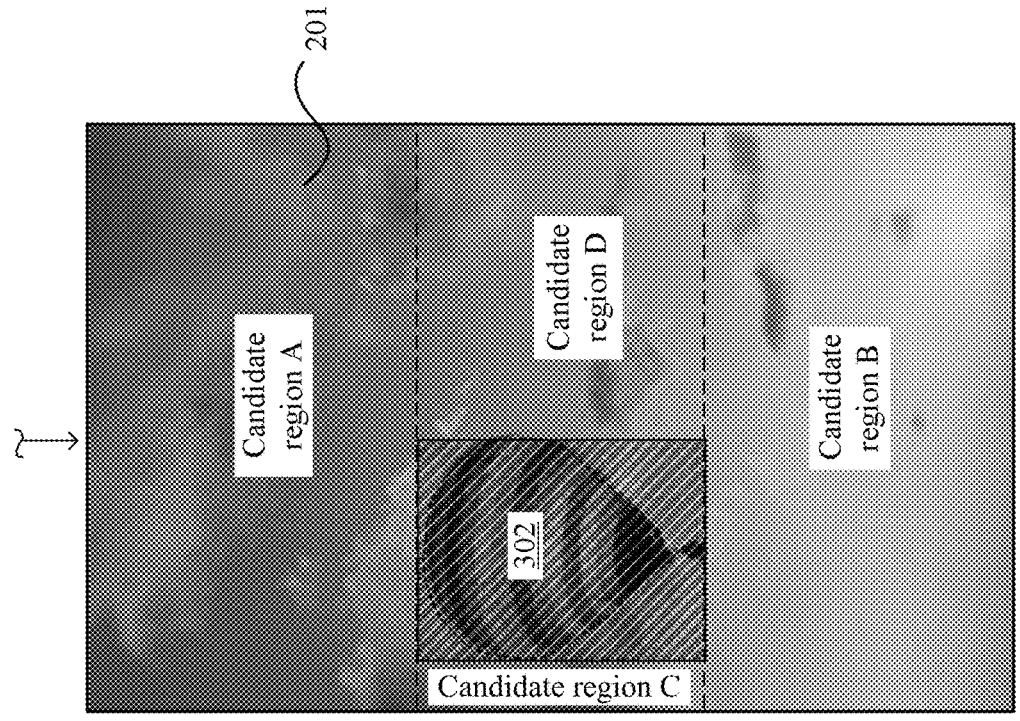
Figure 4B:
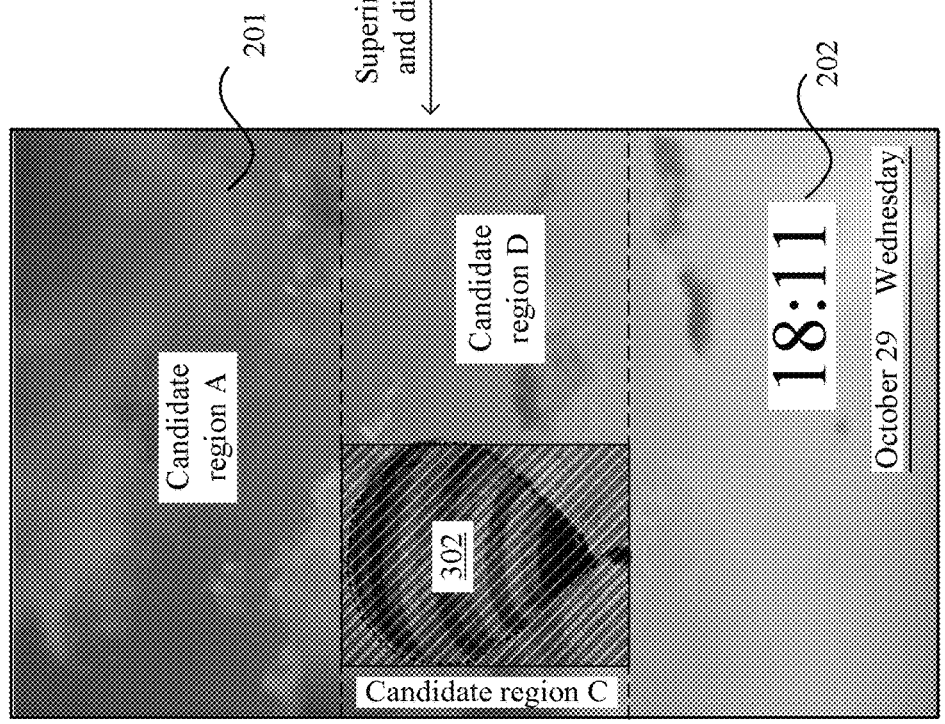

For example, to determine a specific display position of the text 202 on the lock screen wallpaper 201, the terminal may further divide the lock screen wallpaper 201 into regions based on the location of the significant region 301. As shown in FIG. 4A and FIG. 4B, a smallest rectangle 302 including the significant region 301 may be used to mark the significant region 301. In this case, the lock screen wallpaper 201 may be divided into nine sub regions along an extension line of each side length of the smallest rectangle 302. The nine sub regions include one non-target region including the significant region 301 and remaining 8 candidate sub regions for displaying the text 202.

Further, after the lock screen wallpaper 201 is divided into regions, the terminal may calculate similarities between the eight candidate sub regions, for example, calculate a color contrast variance or a Laplace (Laplace) variance of each candidate sub region. If a difference between color contrast variances (or Laplace variances) of a candidate sub region 2 and a candidate sub region 3 is less than a preset value, the terminal may combine the candidate sub region 2 and the candidate sub region 3 into one candidate region. Still as shown in FIG. 4A and FIG. 4B, after region combination, a candidate sub region 1 to the candidate sub region 3 are combined into a candidate region A; a candidate sub region 7 to a candidate sub region 9 are combined into a candidate region B; a candidate sub region 4 is a candidate region C; and a candidate sub region 6 is a candidate region D. To be specific, the lock screen wallpaper 201 is divided into one non-target region including the significant region 301 and four candidate regions for displaying the text 202.

In this case, to determine an optimum candidate region for displaying the text 202, the terminal may calculate smoothness of each of the four candidate regions, where the smoothness may be specifically color smoothness (indicating strength of a color change in the region) of each candidate region, and line smoothness (indicating strength of a line change in the region), a weighted average value of color smoothness and line smoothness, or the like. When the smoothness is higher, it indicates that colors (and/or lines) of the candidate region are more unitary, and that the candidate region is more suitable for laying out the text 202.

For example, during calculation of smoothness of the candidate region, a Laplace variance algorithm may be used to calculate a Laplace variance of each of the four candidate regions, to obtain four Laplace variances. Further, the terminal may perform normalization processing on the four Laplace variances, and normalize the four Laplace variances of different values and dimensions into 0 or 1 dimensionless value interval. In this case, smoothness of a candidate region corresponding to a Laplace variance of a smallest value is the highest, and the terminal may use the candidate region as a target region for displaying the text 202. For example, still as shown in FIG. 4A and FIG. 4B, the terminal may use the candidate region B having the highest smoothness as a target region for displaying the text 202, and superimpose and display the text 202 in the candidate region B.

Certainly, a size of the text 202 may be further considered for selecting a target region. If the size of the text 202 is fixed, the terminal may select a candidate region in which the text 202 can be laid out and whose smoothness is the highest, as a target region. If the size of the text 202 is adjustable, when the text 202 cannot be laid out in the candidate region having the highest smoothness, the terminal may further reduce the size of the text 202 to some extent, so that both the text 202 and the lock screen wallpaper 201 can achieve optimum display effects.

Figure 5A:
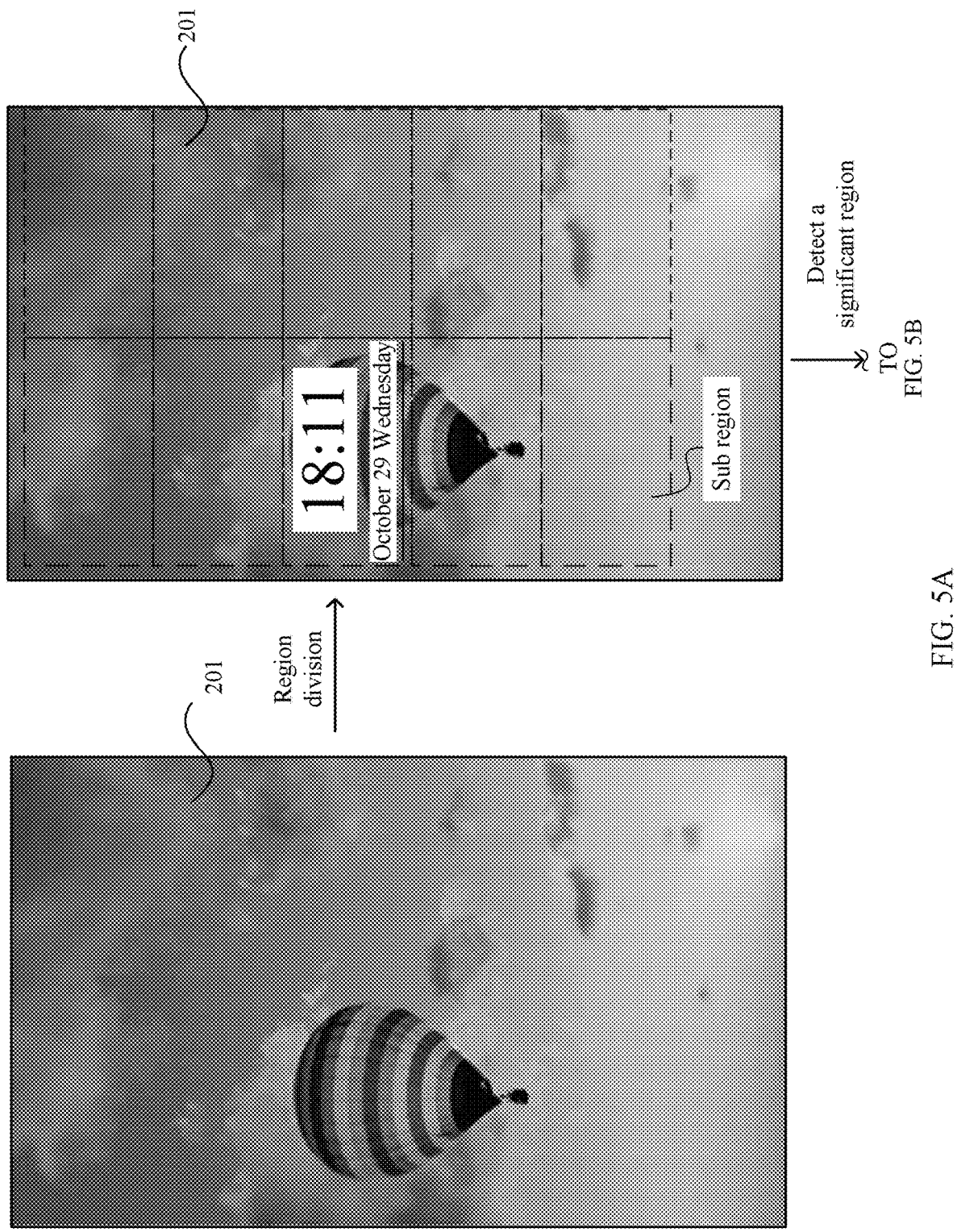
FIG. 5A and FIG. 5B are a schematic diagram 3 of an image method according to an embodiment of this application.
Figure 5B:
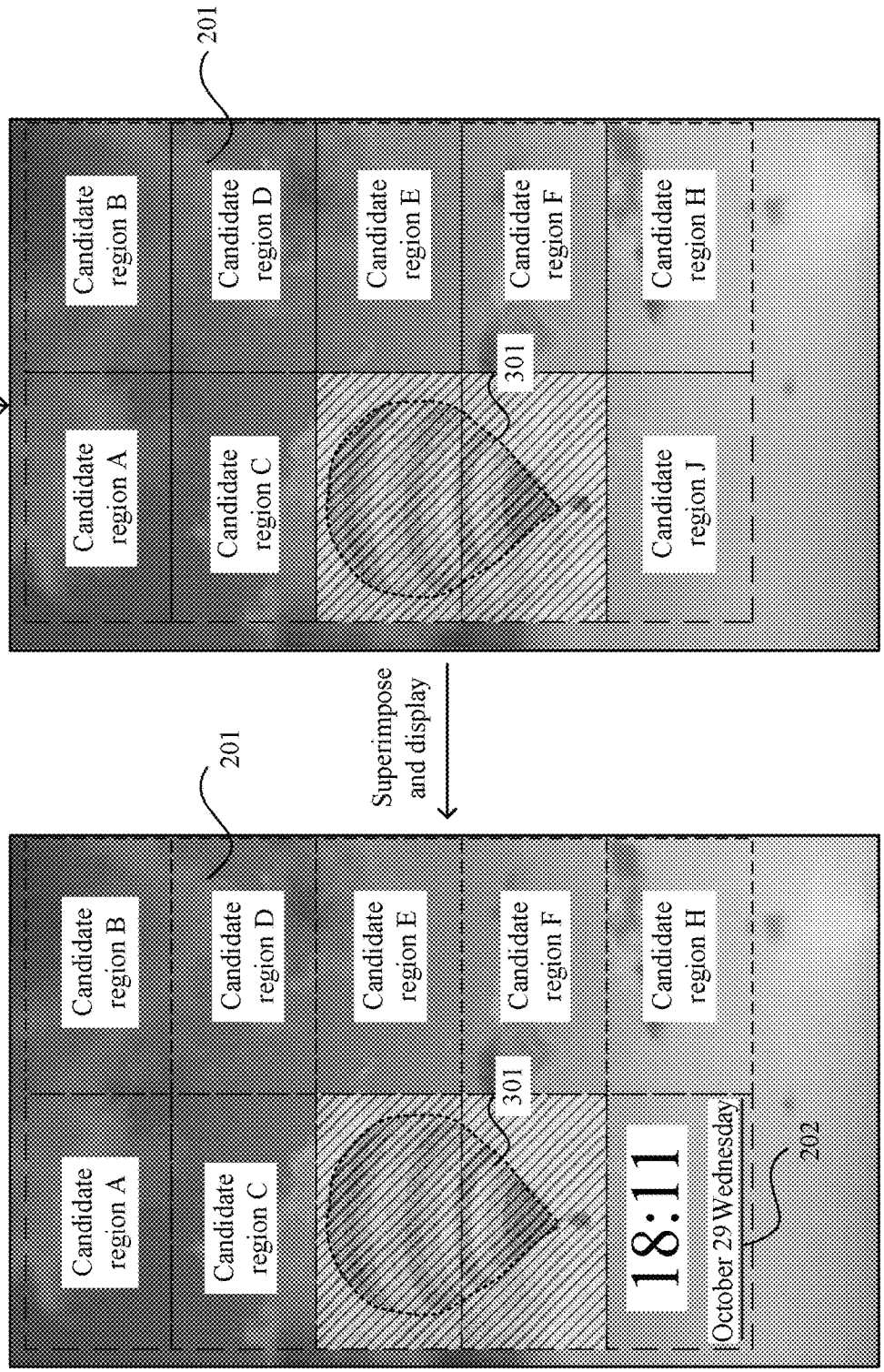

In other embodiments of this application, when the size of the text 202 is fixed, the terminal may further divide the lock screen wallpaper 201 into regions beforehand based on the size of the text 202. As shown in FIG. 5A and FIG. 5B, the lock screen wallpaper 201 may be divided into several sub regions based on the size of the text 202, where a size of each sub region may be greater than or equal to the size of the text 202. In this case, the text 202 can be laid out in each sub region. Certainly, as shown in FIG. 5A and FIG. 5B, for a region whose edge part cannot satisfy the size of the text 202, the terminal may not use the region for laying out the text 202 by default.

In this case, after the lock screen wallpaper 201 is divided into regions, the terminal may detect the significant region in the lock screen wallpaper 201 by using a preset detection algorithm. Still in the example in which the significant region 301 is a region whose contrast is greater than a threshold and in which a hot air balloon is displayed, as shown in FIG. 5A and FIG. 5B, the terminal may exclude a sub region including the significant region 301. In this case, remaining sub regions not including the significant region 301, that is, the candidate region A to a candidate region H shown in FIG. 5A and FIG. 5B, may be used as candidate regions for laying out the text 202. Similarly to the foregoing embodiment, the terminal may subsequently calculate smoothness of each candidate region, and use a candidate region (for example, a candidate region J) having the highest smoothness as a target region for superimposing and displaying the text 202.

Because the target region determined in this case is one of several sub regions that are obtained beforehand through division, but every sub region can be used for laying out the text 202, a case in which a determined target region is not large enough for containing the text 202 does not occur.

Figure 6:
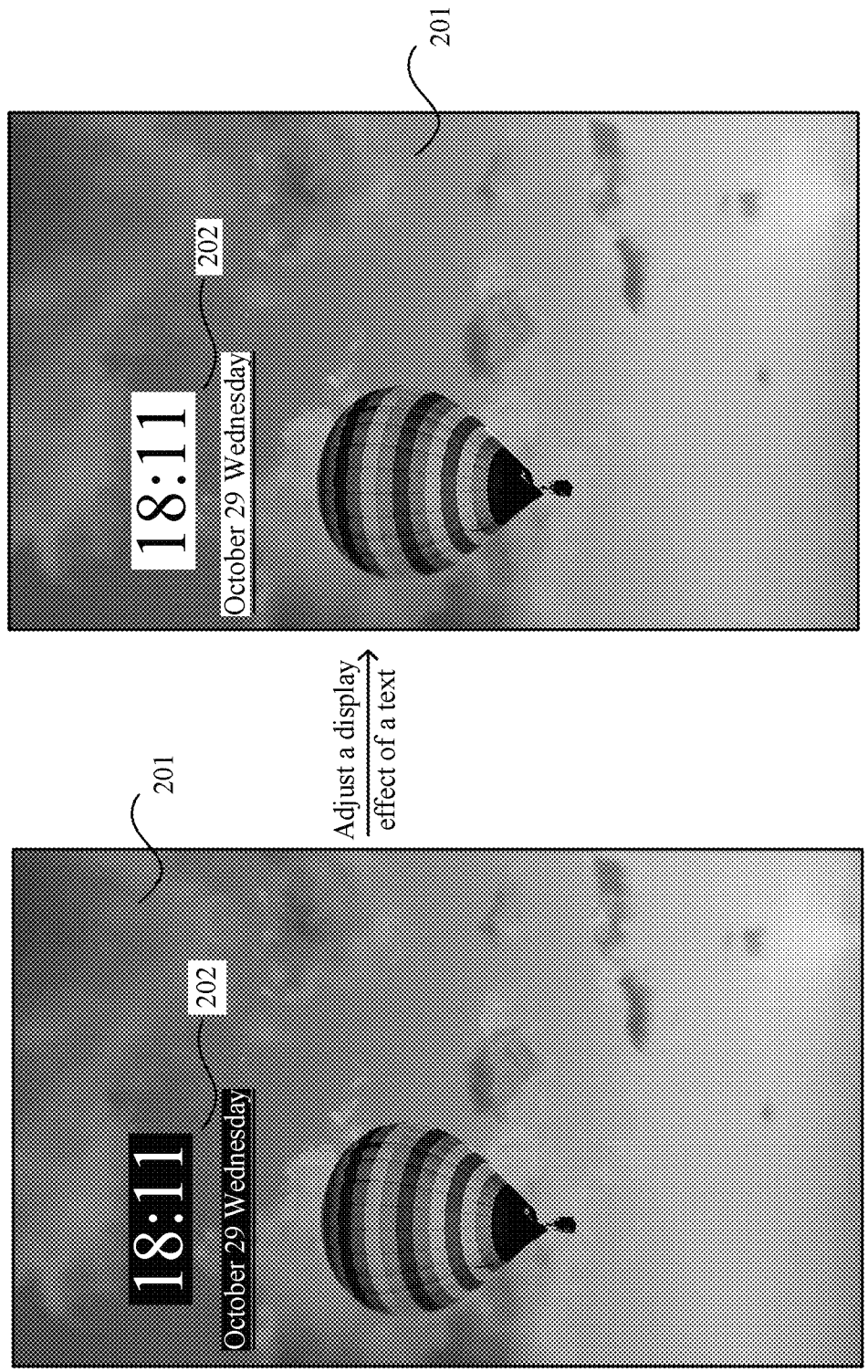
FIG. 6 is a schematic diagram 4 of an image method according to an embodiment of this application.

In addition, when the text 202 is superimposed and displayed in the determined target region, the terminal may further calculate contrasts of the target region and the text 202. When a difference between the contrast of the target region and the contrast of the text 202 is relatively small, it indicates that a color of the target region is similar or approximate to a color presented by the text 202. For example, the terminal may calculate a luminance contrast between the target region and the text 202 in a Lab (a color model) color space. As shown in FIG. 6, colors of both a target region 701 and the text 202 are white. In this case, the calculated luminance contrast is less than a threshold 3.5 specified by WCAG (web content accessibility guidelines, web content accessibility guidelines) on the luminance contrast. To be specific, the text 202 cannot be highlighted in the target region 701. Therefore, still as shown in FIG. 6, the terminal may adjust the color or luminance of the text 202, for example, darken the color of the text 202, so that a difference between the contrast of the target region and the contrast of the text 202 satisfies a pre-specified contrast requirement.

As can be learned, in the image displaying method provided by the foregoing embodiment, when the terminal superimposes and displays any display element on the reference image, an image feature of the reference image and an image feature of the display element are not completely disregarded; instead, a display position and a display form that have a relatively small visual conflict are selected for the display element based on image features in the significant region and the insignificant region in the reference image.

Figure 7:
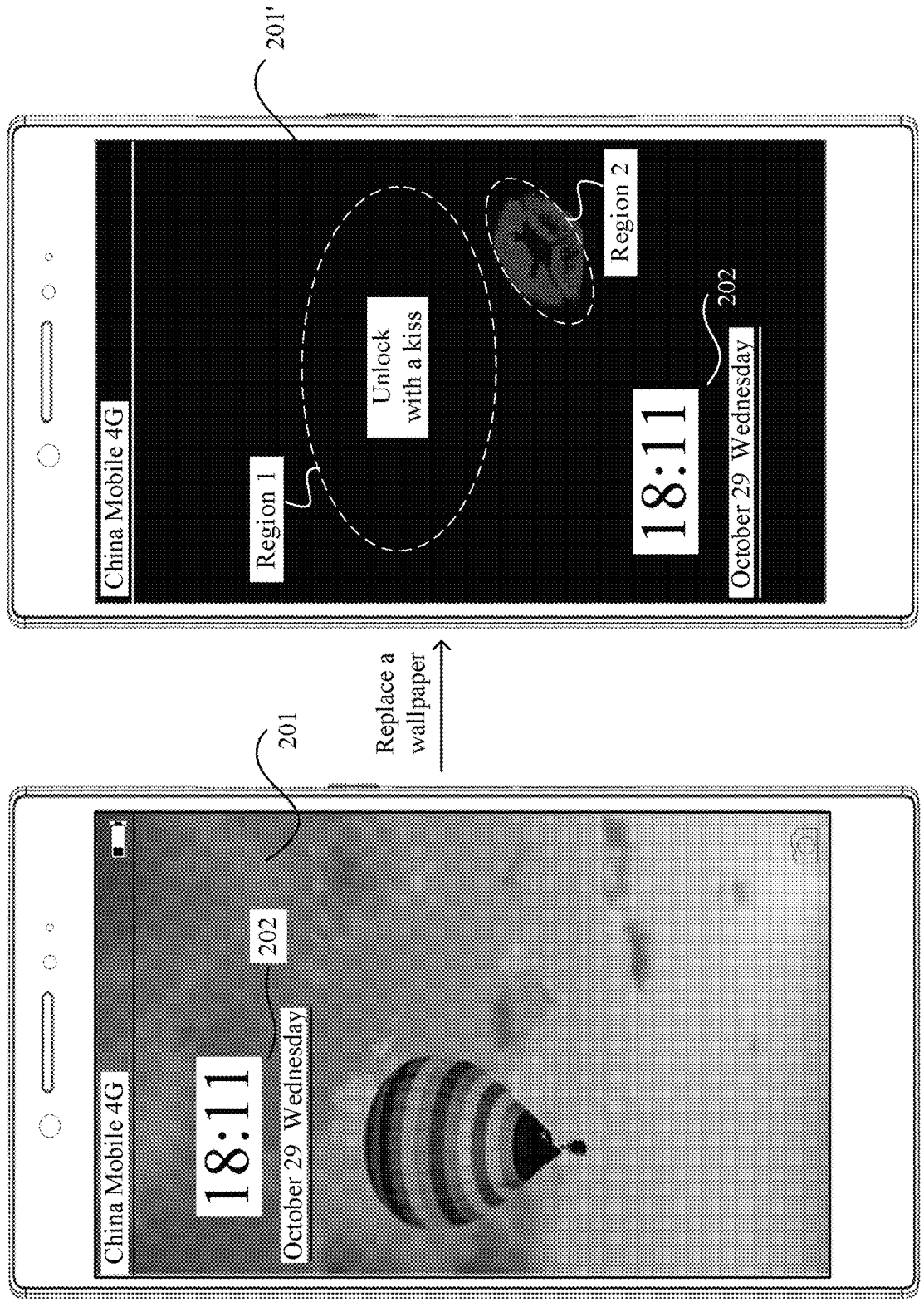
FIG. 7 is a schematic scenario diagram 1 of an image method according to an embodiment of this application.

In this case, when the reference image or the display element changes, a display effect such as the display position of the display element may also change correspondingly. For example, as shown in FIG. 7, when the user replaces the lock screen wallpaper 201 with a lock screen wallpaper 201', the terminal may be triggered to determine a significant region in the lock screen wallpaper 201' according to the foregoing displaying method. For example, the significant region is a region 1 including characters and a region 2 including a lip element in the lock screen wallpaper 201'. Further, the terminal may determine a target region for superimposing and displaying the text 202 in an insignificant region of the lock screen wallpaper 201', and superimpose and display the text 202 in the target region. Therefore, interactive displaying of the reference image and the display element is implemented, so that both the reference image and the display element superimposed on the reference image can achieve relatively good display effects.

In other embodiments of this application, when a display element that has a weak association with the reference image is superimposed and displayed, the terminal may further directly recognize an insignificant region of low interest to human vision in the reference image, and display the display element in the insignificant region. In this way, both the superimposed display element and the significant region of interest to the user in the reference image can be highlighted, to achieve relatively good superimposition and display effects.

Figure 8:
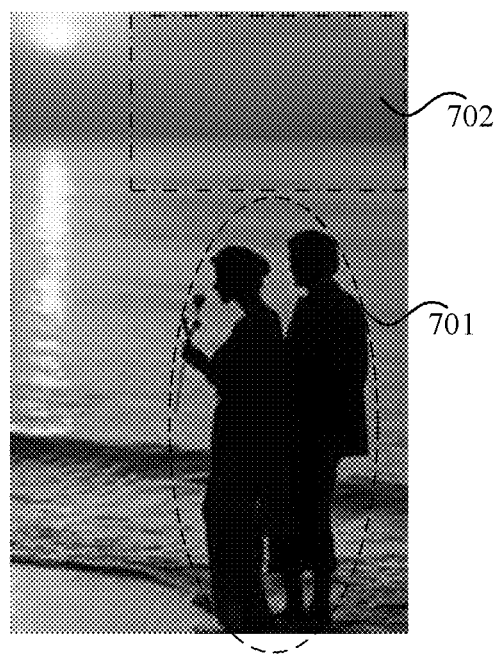
FIG. 8 is a schematic diagram 5 of an image method according to an embodiment of this application.

An insignificant region in an image is generally a remaining region after a portrait, a high-contrast region, and an obvious contour line in the image are excluded. The insignificant region may be further divided into monotonous regions whose colors are unitary and which have no obvious contour lines. As shown in FIG. 8, the significant region in the image is a region 701 including a portrait. Other regions than the region 701 may be all considered as insignificant regions. In this case, in the insignificant regions, a region 702 whose colors are unitary and which has no obvious contour lines may be used as a monotonous region.

Generally, the monotonous region in the image may be determined by using an image segmentation algorithm such as edge detection, color gradient detection, or a watershed algorithm. This is not limited in this embodiment of this application.

In this case, because the association between the reference image and the display element that is superimposed and displayed is relatively weak, that is, there is no direct relationship between the significant region of interest to the user in the reference image and the display element, after the terminal detects the monotonous region in the reference image, the terminal may superimpose and display the display element in the monotonous region of the reference image. This prevents the display element from blocking the significant region of the reference image, and may also prevent the background of the display element from interfering with the display effect of the display element.

Figure 9:
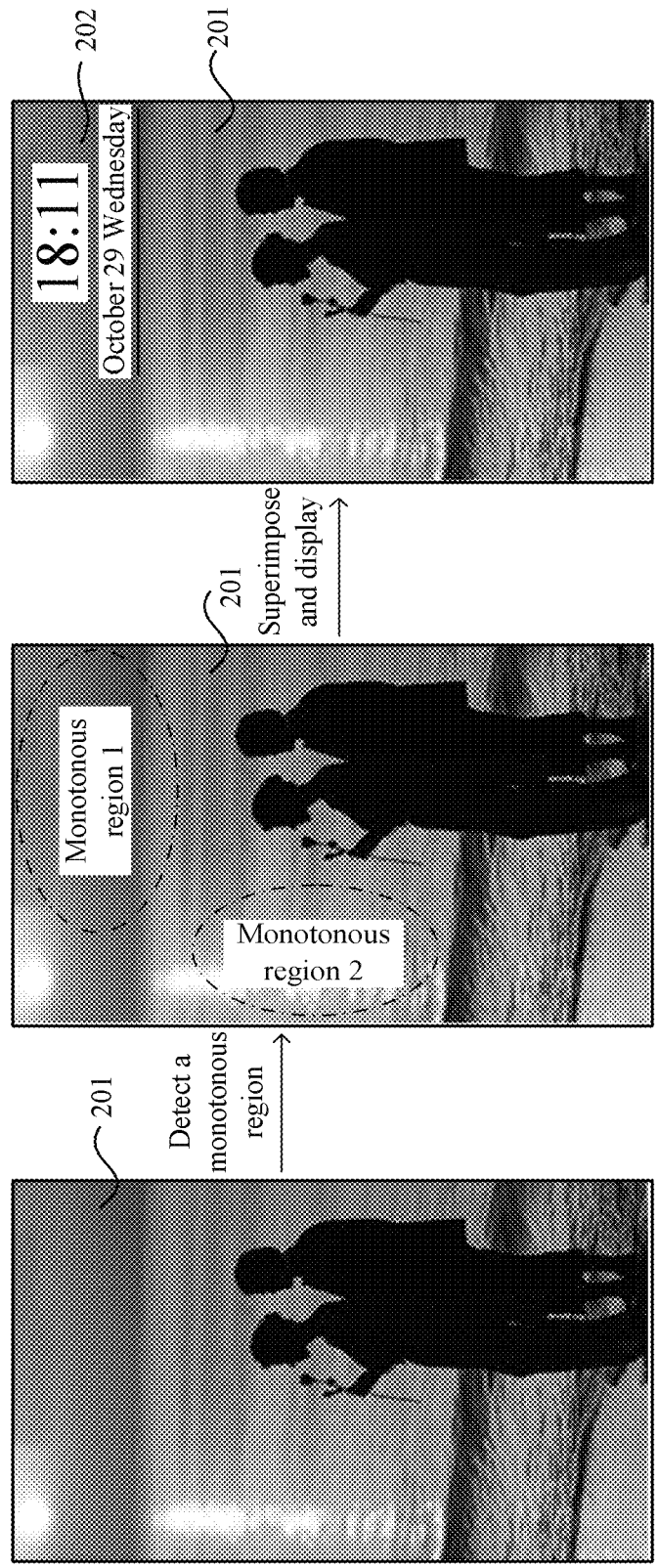
FIG. 9 is a schematic diagram 6 of an image method according to an embodiment of this application.

Still in the example in which the text 202 is superimposed and displayed on the lock screen wallpaper 201, the terminal may first perform edge detection on the lock screen wallpaper 201, detect a white space having no lines or few lines, and further calculate a color gradient variance of each white space. When the color gradient variance is smaller, it indicates that colors of the white space are more unitary. In this case, one or more white spaces whose color gradient variances are less than a preset value may be used as a monotonous region for displaying the text 202 (for example, a monotonous region 1 and a monotonous region 2 in FIG. 9).

When detecting that there are a plurality of monotonous regions, the terminal may select a monotonous region that can contain a largest rectangular area for displaying the text 202, to avoid a phenomenon that the text 202 cannot be properly displayed when the detected monotonous region is relatively large but is in a narrow-strip shape.

As can be learned, the method for directly determining a monotonous region for superimposing and displaying the display element can simplify a procedure for determining a specific position of the display element. Both the reference image and the superimposed display element can achieve relatively good display effects, and display efficiency of the terminal can also be improved.

Similarly, when a difference between the contrast of the monotonous region for displaying the text 202 and the contrast of the text 202 is relatively small, the terminal may adjust the color or luminance of the text 202, so that the difference between the contrast of the monotonous region and the contrast of the text 202 satisfies the pre-specified contrast requirement.

Figure 10:
FIG. 10 is a schematic scenario diagram 2 of an image method according to an embodiment of this application.

In addition, when adjusting the color or luminance of the text 202, the terminal may further set the text 202 to display forms of different fonts, different artistic effects, or gradient effects. For example, in FIG. 10, the text 202 is superimposed and displayed in a sky background of the lock screen wallpaper 201. In this case, the text 202 may be set to a rainbow color display effect associated with the sky background. In this way, scenario interaction between the display element and the background of the display element is implemented in the superimposition and display scenario.

Figure 11:
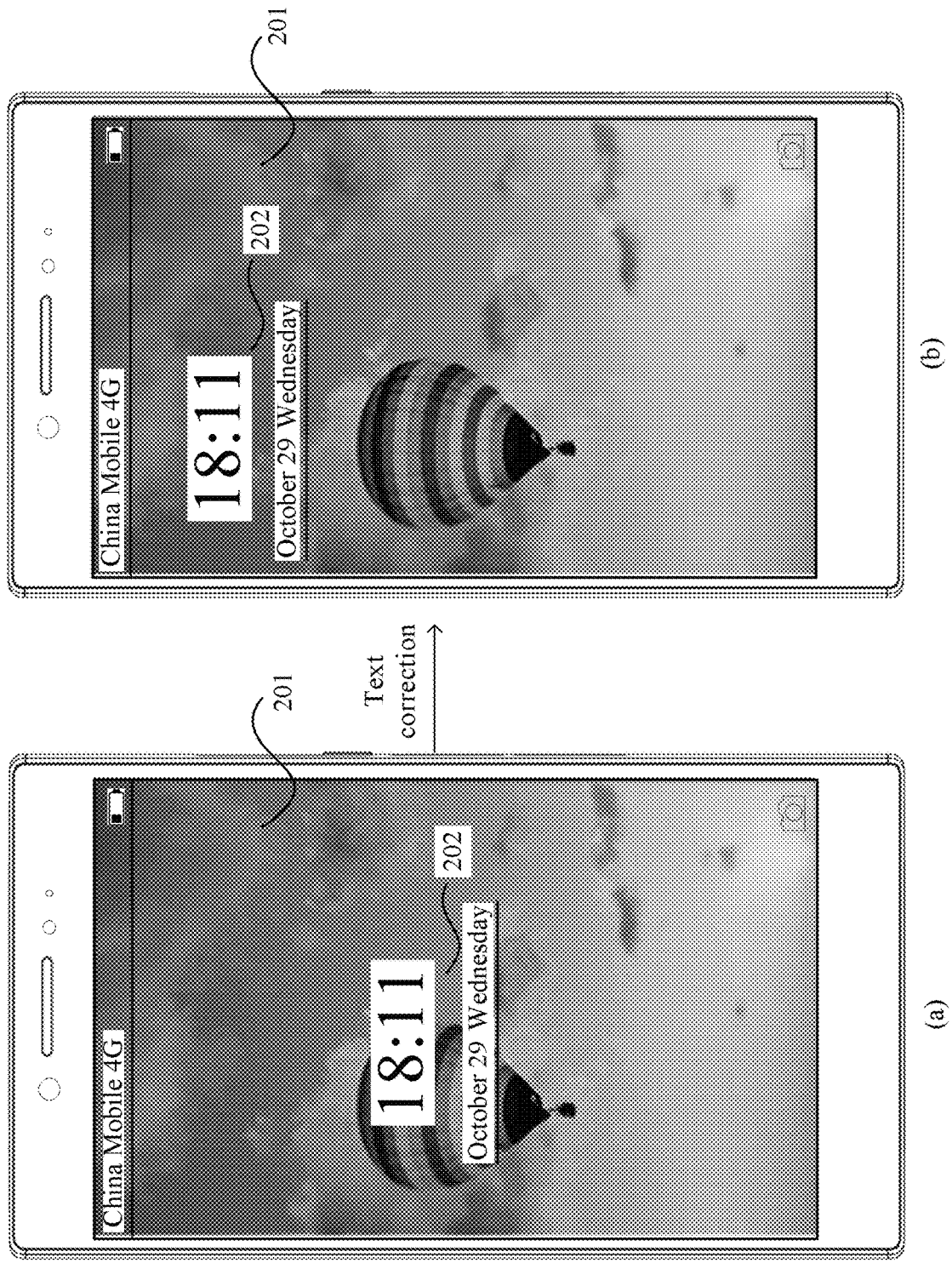
FIG. 11 is a schematic scenario diagram 3 of an image method according to an embodiment of this application.

It should be noted that, a specific position of a display element in some superimposition and display scenarios is preset. For example, in (a) of FIG. 11, an operating system of the terminal presets the display position of the text 202 to a center of the lock screen wallpaper 201. In this case, when the text 202 is superimposed and displayed on the lock screen wallpaper 201, the terminal may further obtain a relative position relationship between the preset position of the text 202 and the lock screen wallpaper 201. When the preset position of the text 202 covers a part or an entirety of the significant region detected in the lock screen wallpaper 201, the terminal can still correct the position of the text 202 according to the foregoing displaying method. As shown in (b) of FIG. 11, the terminal moves the text 202 from the significant region of the lock screen wallpaper 201 to the insignificant region of the lock screen wallpaper 201, to ensure that both the text and the lock screen wallpaper achieve relatively good display effects.

In addition, in the foregoing embodiment, the text superimposed and displayed on the lock screen wallpaper is used as an example to describe a specific method for superimposing and displaying when an association between the reference image and the superimposed display element is relatively weak. It may be understood that, the foregoing displaying method may be applied to any superimposition and display scenario in which an association between the reference image and the display element is weak. This is not limited in this embodiment of this application.

For example, when an application icon is superimposed and displayed on a desktop wallpaper of the terminal, a significant region and an insignificant region of the wallpaper may also be detected, and an application icon with a weak association is displayed in an insignificant region of the wallpaper. This prevents the application icon from blocking a position that easily attracts the user's visual focus on the wallpaper, and can also ensure a display effect of the application icon.

Further, when an application icon 302 is superimposed and displayed on a wallpaper 301, the terminal may further adjust a display effect of the application icon 302 based on an image feature of the wallpaper 301, for example, specific display content in the wallpaper 301, or a color change trend in the wallpaper 301, so that the application icon 302 and the wallpaper 301 can be interactive, to achieve interactive display effects of the application icon 302 and the wallpaper 301.

Figure 12A:
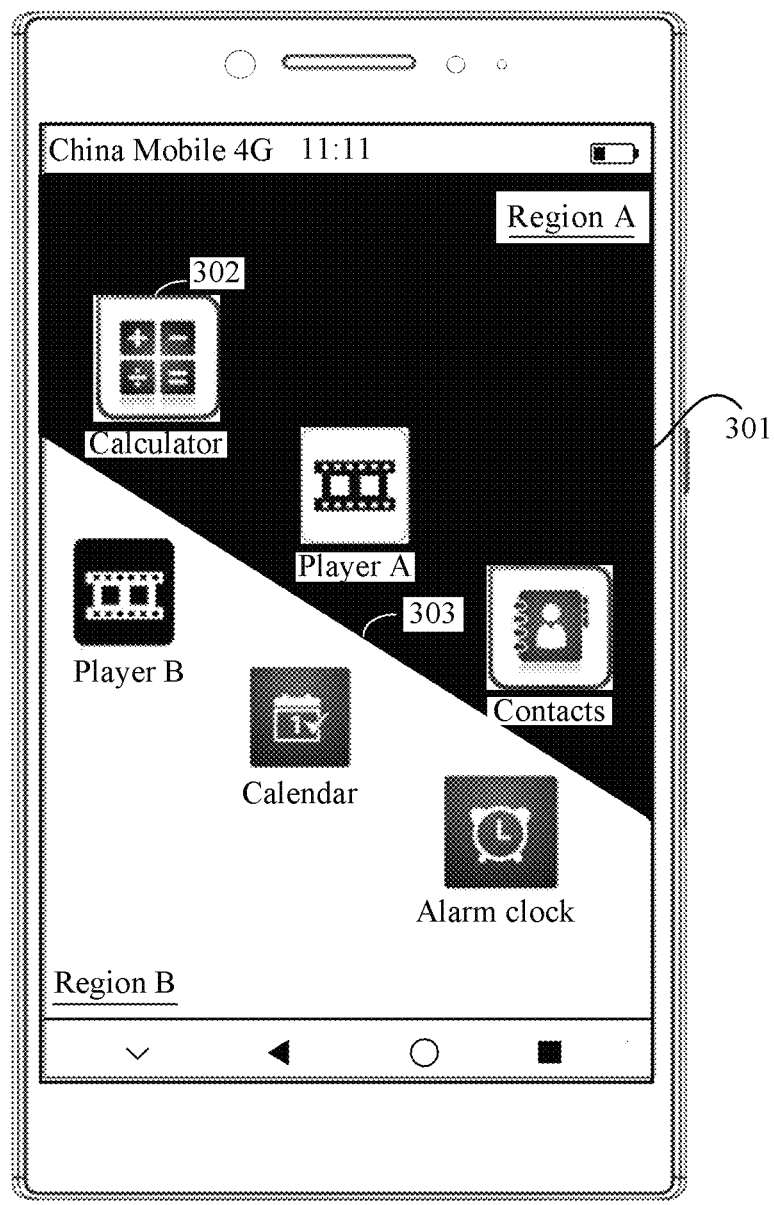
FIG. 12A is a schematic scenario diagram 4 of an image method according to an embodiment of this application.

For example, as shown in FIG. 12A, the wallpaper 301 includes two large color areas: black and white. In this case, the terminal may lay out application icons 302 that need to be superimposed and displayed, in a black region A and a white region B respectively along a boundary line 303 between black and white. In this case, a display background of each application icon 302 in the region A is black, and to highlight the application icon 302, the terminal may display the application icon 302 as a white display effect. Correspondingly, a display background of each application icon 302 in the region B is white, and to highlight the application icon 302, the terminal may display the application icon 302 as a black display effect.

Figure 12B:
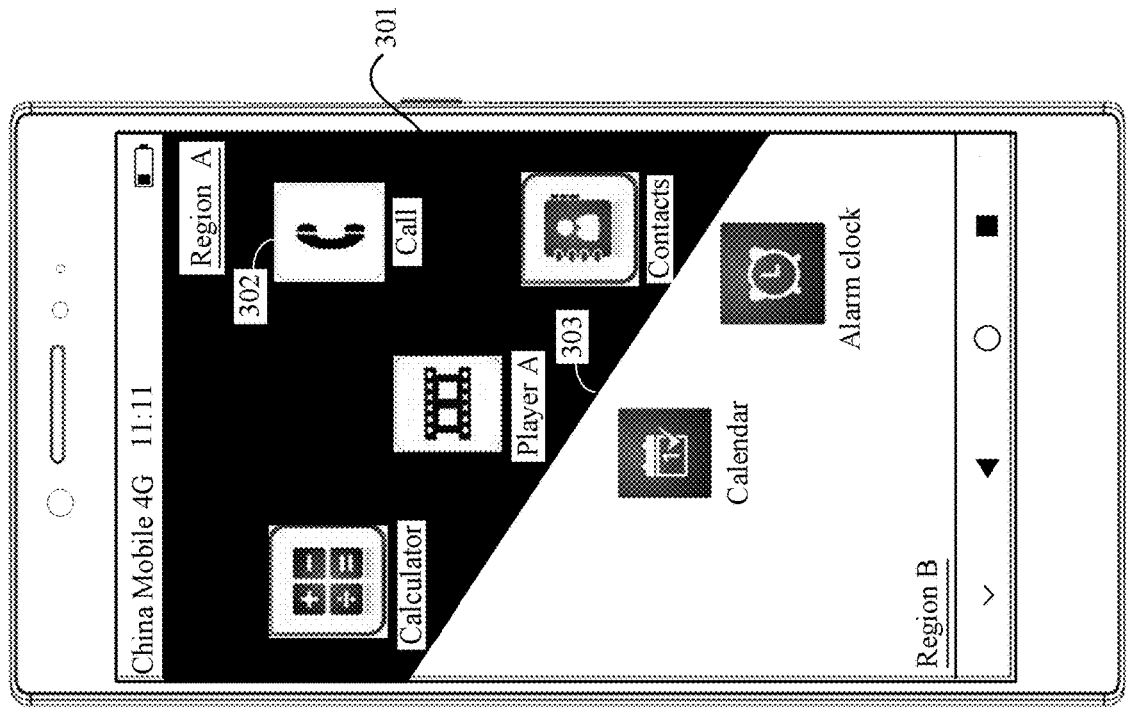
FIG. 12B is a schematic scenario diagram 5 of an image method according to an embodiment of this application.
Figure 12B:
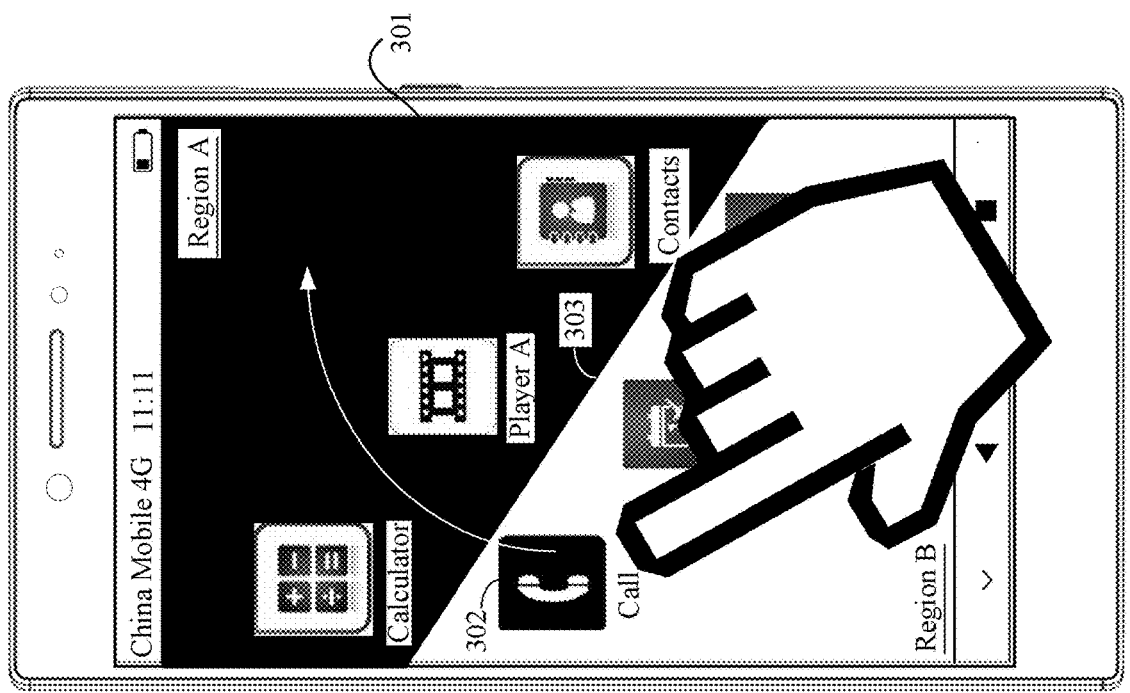

Further, as shown in FIG. 12B, when the user drags an application icon 302 of a call application from the region B to the region A, in response to the dragging operation of the user, the terminal needs to superimpose and display the application icon 302 in the region A. In this case, the terminal may adjust the application icon 302 from the black display effect to the white display effect, to highlight the application icon 302 in the region A.

Figure 12C:
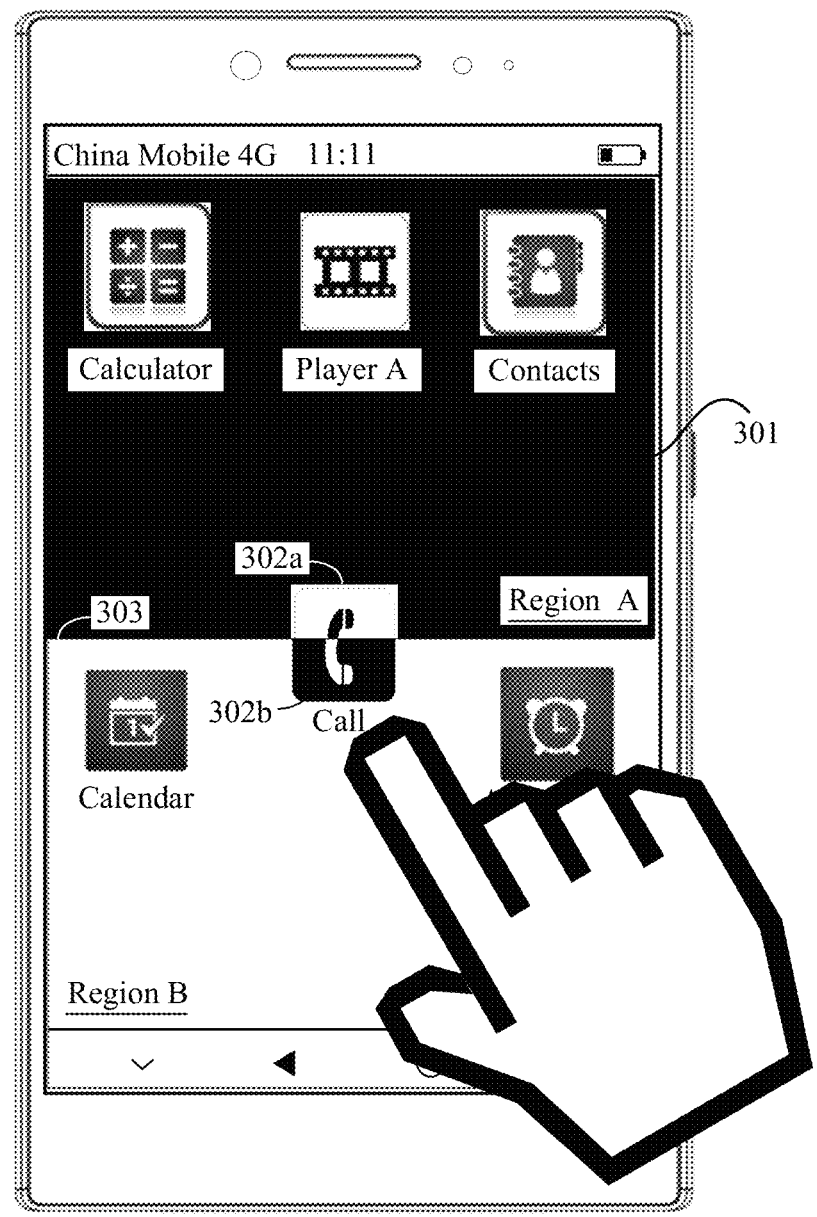
FIG. 12C is a schematic scenario diagram 6 of an image method according to an embodiment of this application.

In a process of moving the application icon 302 from the region B to the region A, the display effect of the application icon 302 may gradually transition from black to white. For example, as shown in FIG. 12C, when the user drags the application icon 302 to the boundary line 303 between the region A and the region B, a first part 302a of the application icon 302 is located in the region A, and a second part 302b of the application icon 302 is located in the region B. In this case, the first part 302a may be adjusted to the white display effect, and the second part 302b may still keep the black display effect, so that a relatively gentle transition is presented when the application icon 302 changes the display effect. In a possible embodiment, the display effect may change in real time.

In this way, when the application icon is superimposed and displayed, the application icon that is superimposed and displayed may be laid out properly based on the image feature of the wallpaper. This provides the user with a display effect more compliant with human vision, and may help the user quickly lock a required application icon on the wallpaper.

Figure 13:
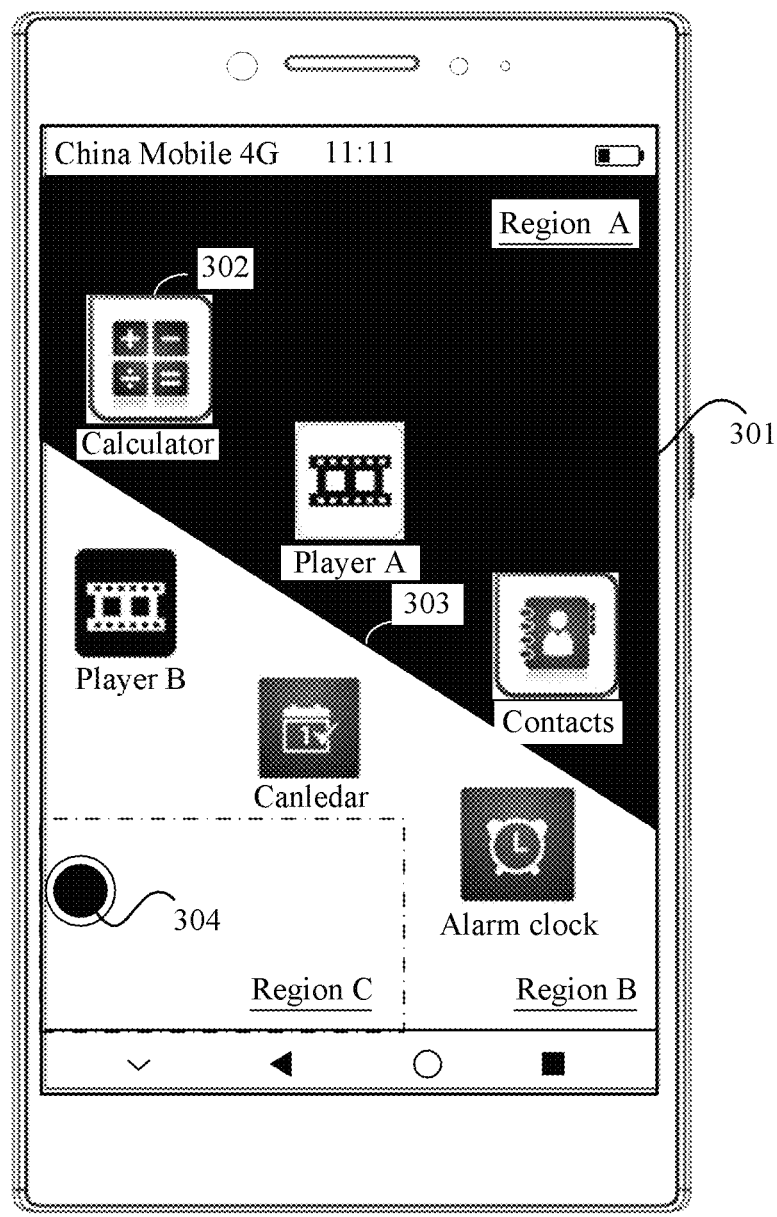
FIG. 13 is a schematic scenario diagram 7 of an image method according to an embodiment of this application.

Alternatively, after the terminal superimposes and displays the application icon 302 on the wallpaper 301, the terminal may further use a display interface including the wallpaper 301 and the application icon 302 as a reference image, and continue to superimpose and display other display elements on the reference image, for example, a suspend button 304 shown in FIG. 13.

Similarly, there is no direct association between the suspend button 304 and the reference image including the wallpaper 301 and the application icon 302 either. Therefore, the terminal may perform image detection on the reference image, to determine a significant region (or a monotonous region) in the reference image. For example, still as shown in FIG. 13, it may be detected that the significant region in the reference image is each position for displaying the application icon 302, but the monotonous region in the reference image is a white region C not displaying the application icon 302 in the region B. In this case, the terminal may use the white region C as a target region, and superimpose and display the suspend button 304 in the white region C. This prevents the suspend button 304 from blocking the application icon 302 in the reference image.

In addition, to prevent a white background in the white region C from interfering with a display effect of the suspend button 304, the terminal may adjust a color of the suspend button 304 to the black display effect.

Figure 14A:
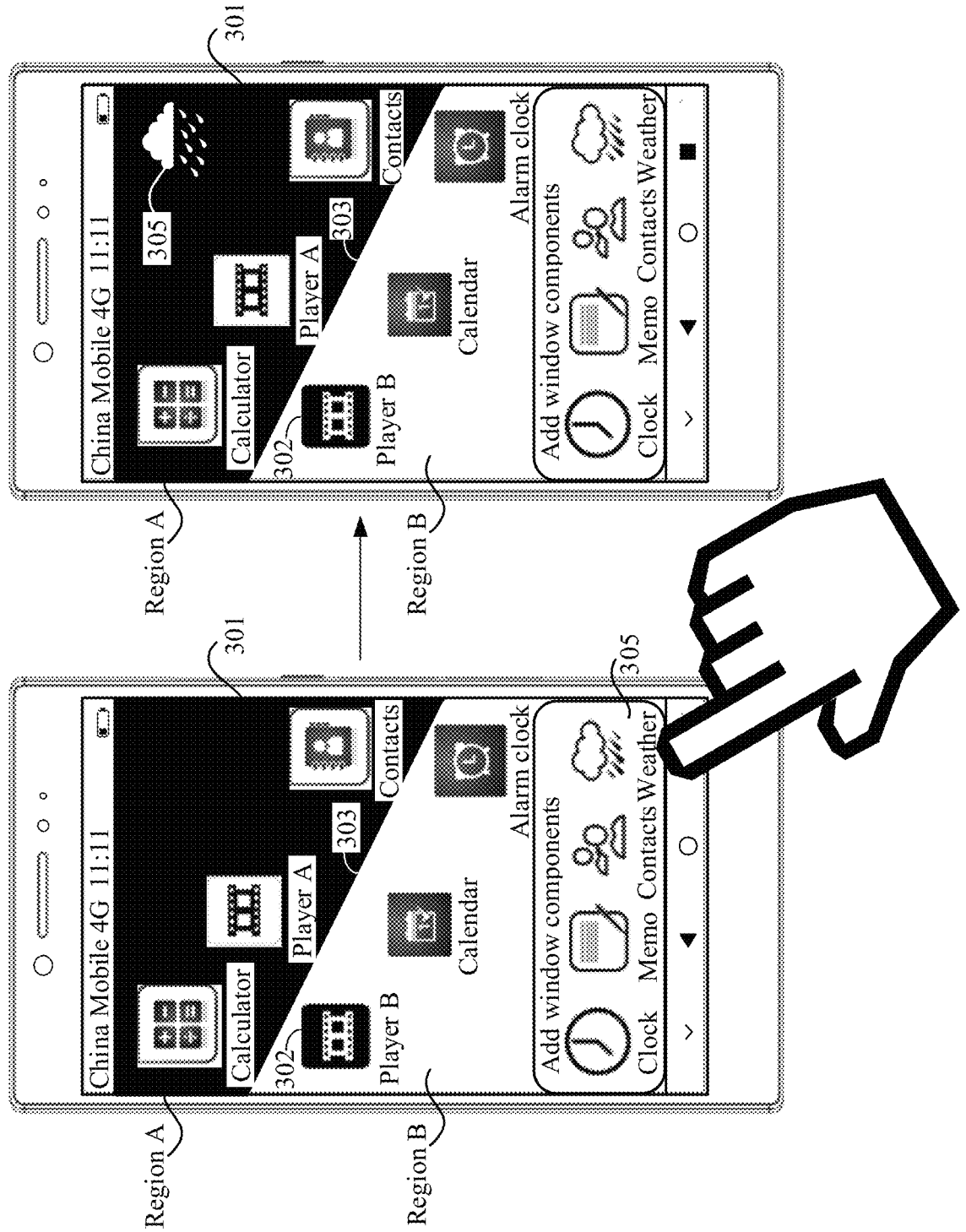
FIG. 14A is a schematic scenario diagram 8 of an image method according to an embodiment of this application.

Alternatively, the user may further add various types of window components (widget) to the desktop of the terminal. In this case, the terminal needs to superimpose and display the window components on the wallpaper 301. As shown in FIG. 14A, when the user selects, from candidate window components, a weather forecast window component 305 that needs to be added, the terminal may use the current wallpaper 301 and the application icon 302 on the wallpaper 301 as the reference image, determine an insignificant region in the reference image according to the displaying method provided in the foregoing embodiment, and determine, in the insignificant region, a target region for superimposing and displaying the window component 305, for example, a black blank region in an upper right corner of the wallpaper 301 in FIG. 14A. In this way, when the window component 305 added by the user is superimposed and displayed, the window component 305 and the application icon on the wallpaper 301 do not mutually interfere.

Figure 14B:
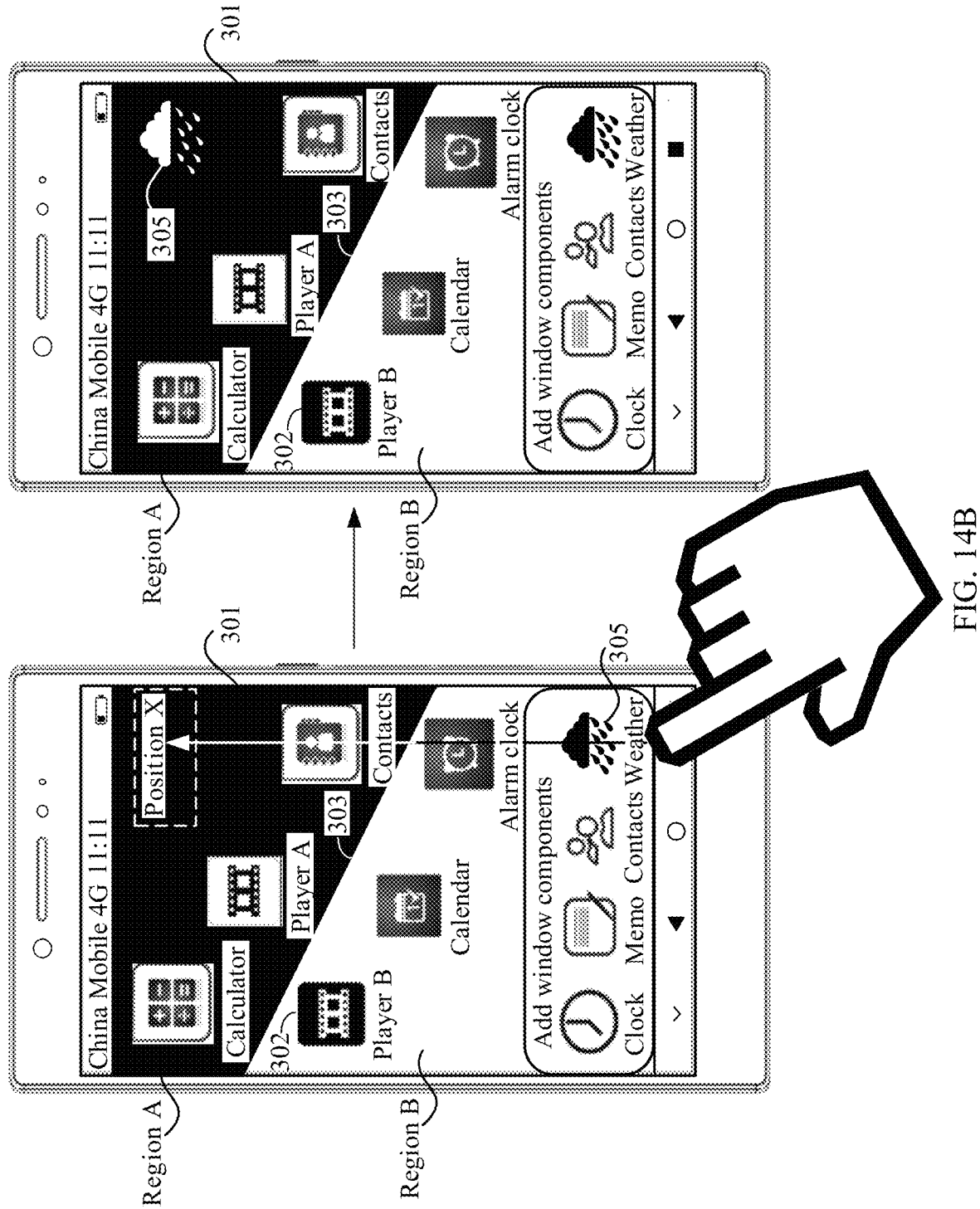
FIG. 14B is another schematic scenario diagram 8 of an image method according to an embodiment of this application.

Certainly, the user may further manually drag the selected window component 305 to a specific position on the desktop for displaying, as shown in FIG. 14B. The terminal detects that the user drags the window component 305 to a position X in the upper right corner of the wallpaper 301. In this case, the terminal may adjust the window component 305 from the original black display effect to the white display effect, and superimpose and display the window component 305 in the position X.

Figure 15:
FIG. 15 is a schematic scenario diagram 9 of an image method according to an embodiment of this application.

In other embodiments, the terminal may further generate a photo collection such as a story album (story album) or memories (memories) for the user based on stored photos. Generally, the terminal may select a photo from the generated photo collection as a cover photo of the album, and superimpose and display a tag of the album on the cover photo, for example, "best memory in the last week". In this case, in this embodiment of this application, the terminal may still use the foregoing displaying method for superimposing and displaying the tag of the album on the cover photo. In this case, as shown in FIG. 15, the terminal may display the tag 306 of the album in an insignificant region in the cover photo 307, for example, a region avoiding a human face in the cover photo 307, or a region avoiding a building in the cover photo 307. This is not limited in this embodiment of this application.

Figure 16A:
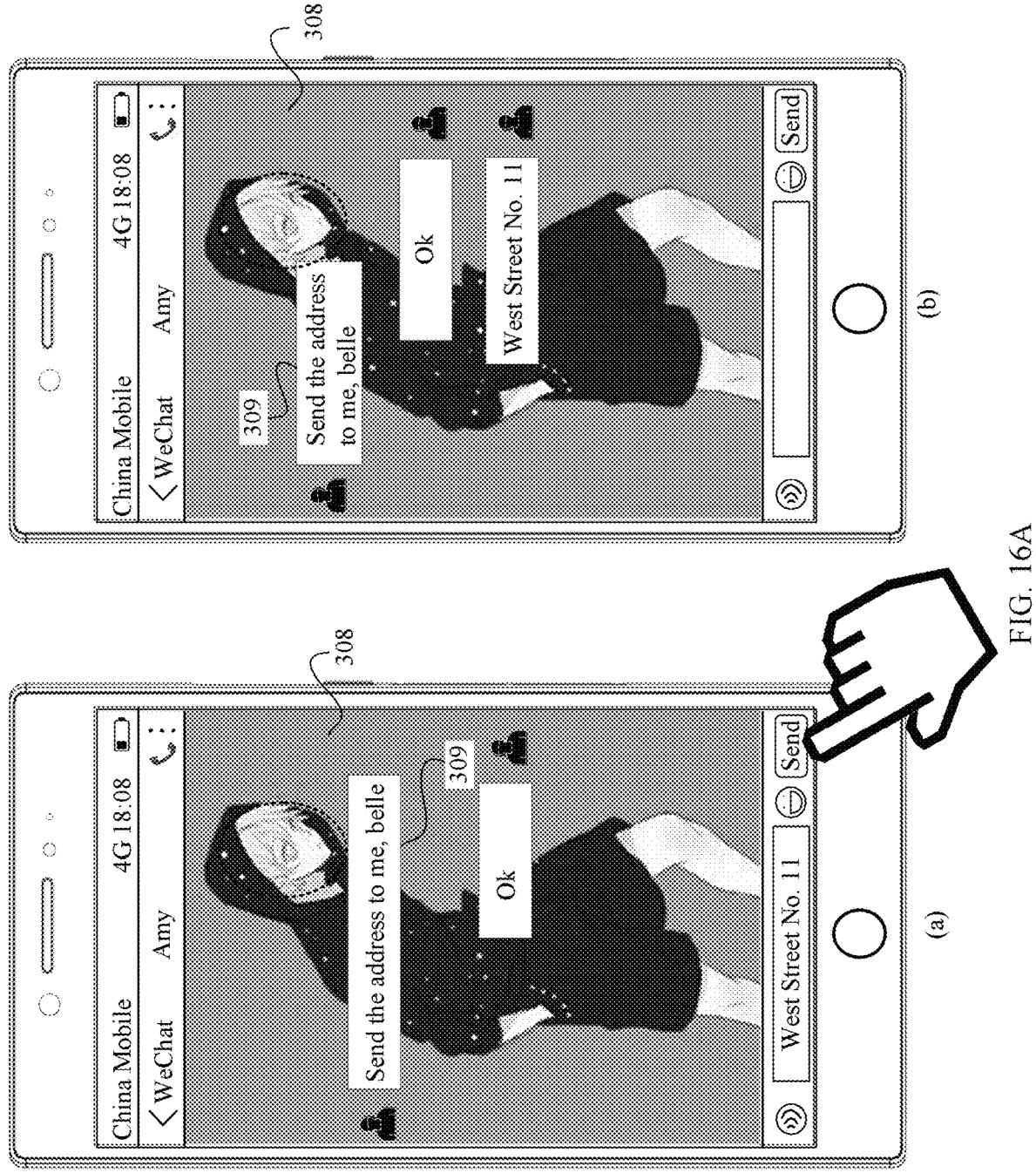
FIG. 16A is a schematic scenario diagram 10 of an image method according to an embodiment of this application.

In other embodiments, an interface element displayed in any application run in the terminal may also be used as the reference image. Using a WeChat application as an example, as shown in FIG. 16A, when the user starts the WeChat application to enter a chat interface, the terminal may use a chat background 308 set by the user as the reference image, and superimpose and display, on the chat background 308, a chat bubble 309 entered by the user, where the chat bubble 309 includes chat information entered by the user.

In this case, after the terminal detects a significant region (that is, a dotted-line region in FIG. 16A) on the chat background 308, when the chat bubble 309 is superimposed and displayed, the significant region may be avoided during a layout. As shown in (a) of FIG. 16A, a chat bubble 309 whose chat content is "send the address to me, belle" is superimposed and displayed in the insignificant region of the chat background 308. When the user enters new chat content, for example, "West Street No. 11", the terminal needs to adjust a display position of the chat bubble 309 to lay out the newly entered chat content. In this case, as shown in (b) of FIG. 16A, to prevent the chat bubble 309 from blocking a significant region including a human face, the terminal may perform break-line displaying on the chat content in the chat bubble 309, so that a display effect of the chat bubble 309 does not conflict with the significant region of the chat background 308.

Figure 16B:
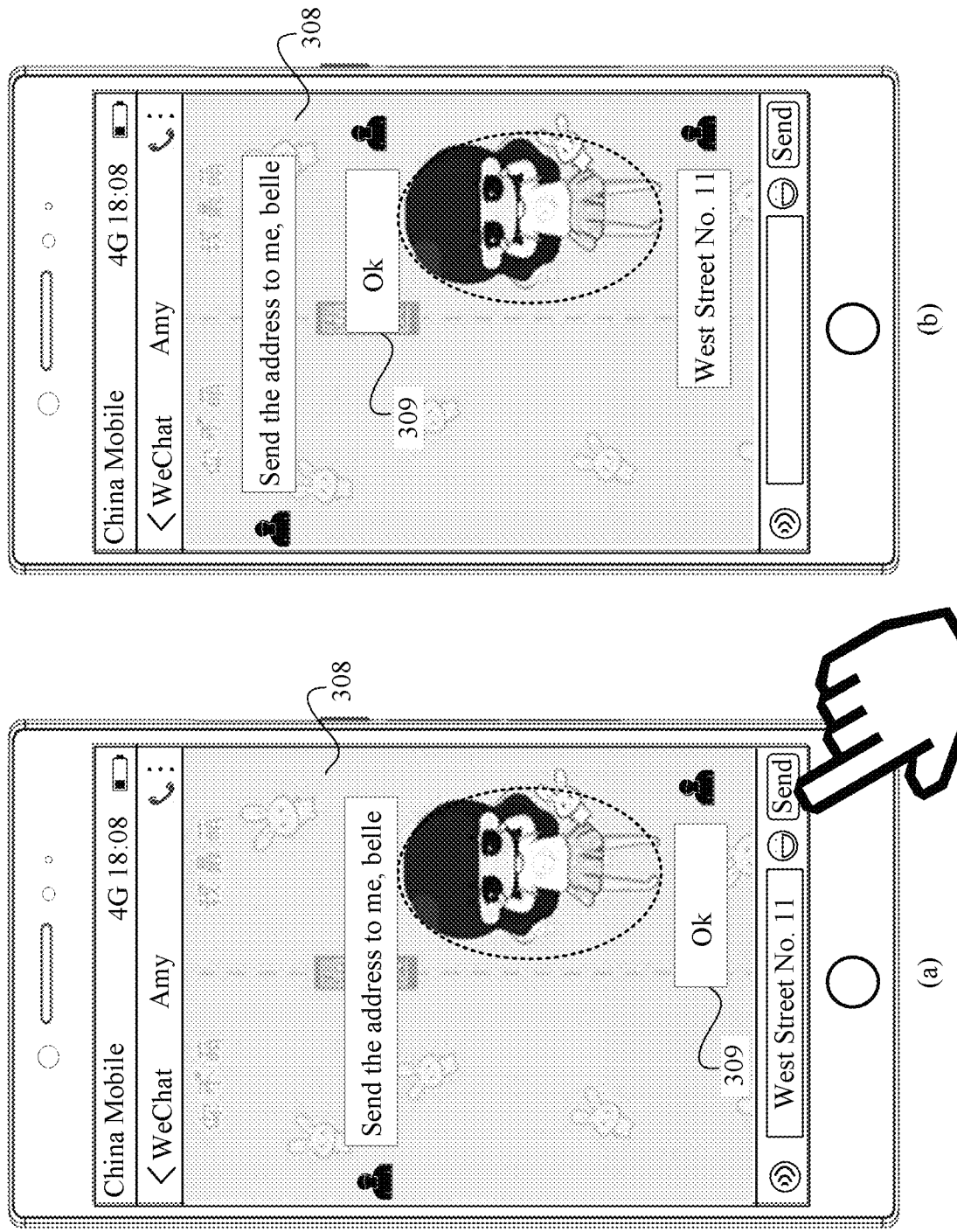
FIG. 16B is a schematic scenario diagram 11 of an image method according to an embodiment of this application.

For another example, as shown in (a) of FIG. 16B, for example, the chat background 308 is used as a reference image, and a chat bubble 309 whose chat content is "Ok" is a display element that is superimposed and displayed. When the user enters new chat content, for example, "West Street No. 11", the terminal needs to adjust a display position of the chat bubble 309 to lay out the newly entered chat content. In this case, as shown in (b) of FIG. 16B, to prevent the chat bubble 309 from blocking a significant region (a dotted-line region in FIG. 16B) of the chat background 308, the terminal may further lay out the chat bubble 309 near the significant region by crossing the significant region, so that a display effect of the chat bubble 309 does not conflict with the significant region of the chat background 308.

To be specific, when an association between the reference image and the display element that is superimposed and displayed is relatively weak, to prevent the reference image and the display element from mutually generating visual interference, the display element may be superimposed and displayed in an insignificant region of a reference element, but the specific display effect of the display element in the insignificant region may also be adjusted based on the image feature of the background of the display element. Therefore, a personalized intelligent superimposition and display effect is provided for the user. In this way, interactive display effects of the superimposition element and the superimposed element are achieved.

When the terminal adjusts the display effect of the display element, the terminal may specifically adjust a position, a type, a shape, a size, a color, a special effect, and luminance of the display element, and image content. This is not limited in this embodiment of this application.

In other embodiments of this application, when a display element having a relatively strong association with the reference image needs to be superimposed and displayed, the terminal may perform image recognition on the reference image to recognize an associated region having a relatively strong association with the display element in the reference image, and further present the association relationship between the display element and the associated region when superimposing and displaying the display element.

Figure 17:
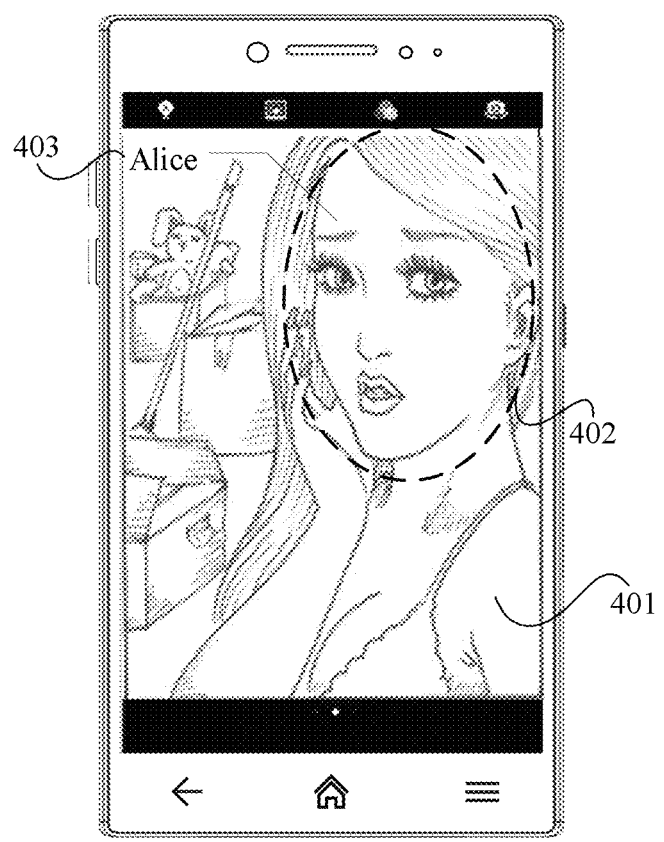
FIG. 17 is a schematic scenario diagram 12 of an image method according to an embodiment of this application.

For example, in an example in which a tag of picture (tag of picture) is superimposed and displayed in a target image, as shown in FIG. 17, after the terminal obtains a target image 401 by shooting by using a camera, the terminal may recognize key content in the target image 401 by using a picture recognition algorithm, for example, information such as a person, an animal, a scene, and a text in the picture, and a time and a place at which the picture is shot. As shown in FIG. 17, when the terminal prestores face feature information of Alice, the terminal may determine, by using a human face recognition algorithm, an associated region 402 associated with Alice in the target image 401, that is, a region including Alice's face.

In this case, when the tag 403 of the picture is superimposed and displayed, as shown in FIG. 17, the tag 403 of the picture may be superimposed and displayed near the associated region 402 by using a notation format such as a bubble, to establish an association relationship between the tag 403 of the picture and the associated region 402. In this way, the tag 403 of the picture does not block associated content in the associated region 402, and can further accurately present an object to which the tag 403 of the picture is applied, so that both the superimposed and displayed tag of the picture 403 and the target image 401 can achieve relatively good display effects.

Certainly, when the tag 403 of the picture is superimposed and displayed, the terminal may further adjust a display effect of the tag 403 of the picture based on an image feature of the associated region 402 or the background of the associated region 402. This is not limited in this embodiment of this application.

Figure 18:
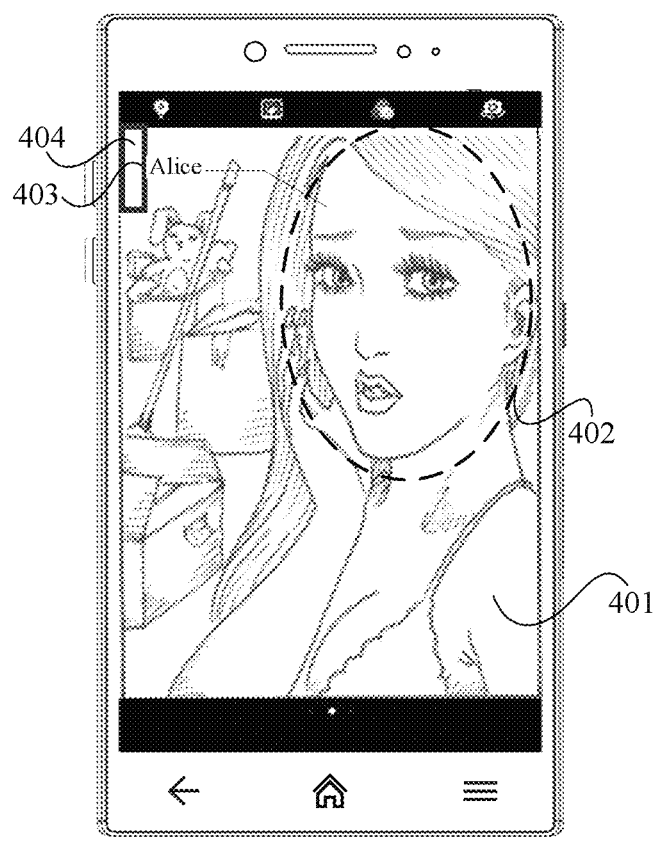
FIG. 18 is a schematic scenario diagram 13 of an image method according to an embodiment of this application.

For example, as shown in FIG. 18, the terminal recognizes that the person in the target image 401 is Alice, and the terminal needs to superimpose and display the tag 403 of the picture associated with the associated region 402 in which Alice is located. In this case, if the terminal determines, through intelligent learning or a prestored person relationship, that a love relationship exists between Alice and an owner B of the terminal, the terminal may superimpose and display the tag 403 of the picture by using a love effect including a love element 404, to provide the user with substitutive interactive scene experience.

Figure 19:
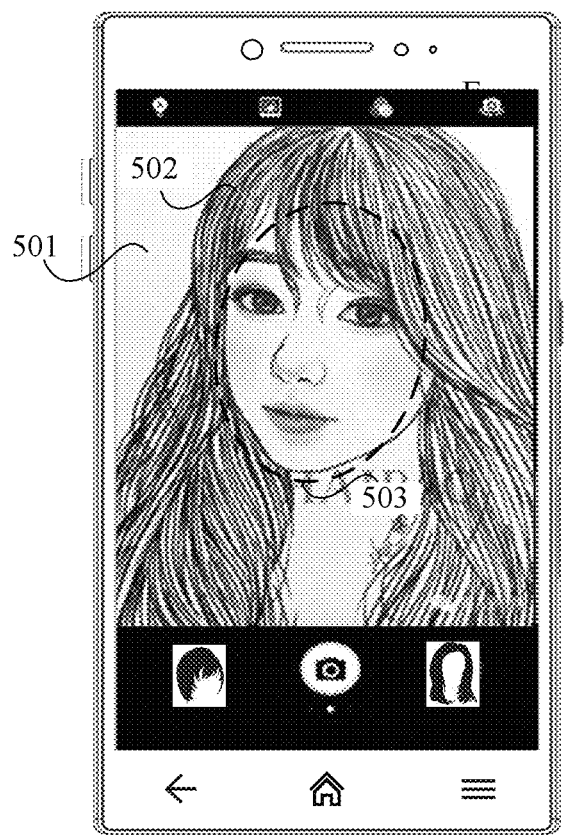
FIG. 19 is a schematic scenario diagram 14 of an image method according to an embodiment of this application.

Alternatively, for example, the terminal superimposes and displays a special animation effect in a preview picture in a photographing process. As shown in FIG. 19, the terminal enters a shooting mode after starting the camera. In this case, the terminal may display a preview picture 501 captured by the camera. When the user selects a specified special hair style effect 502, the terminal may perform image recognition on the preview picture 501 to recognize an associated region 503 associated with the special hair style effect 502. To be specific, the preview picture 501 includes a region of a human face. In this case, the terminal may superimpose and display the special hair style effect 502 along a hair line of the human face in the region 503, and interactive displaying of the special hair style effect 502 and the associated region 503 is implemented.

Figure 20:
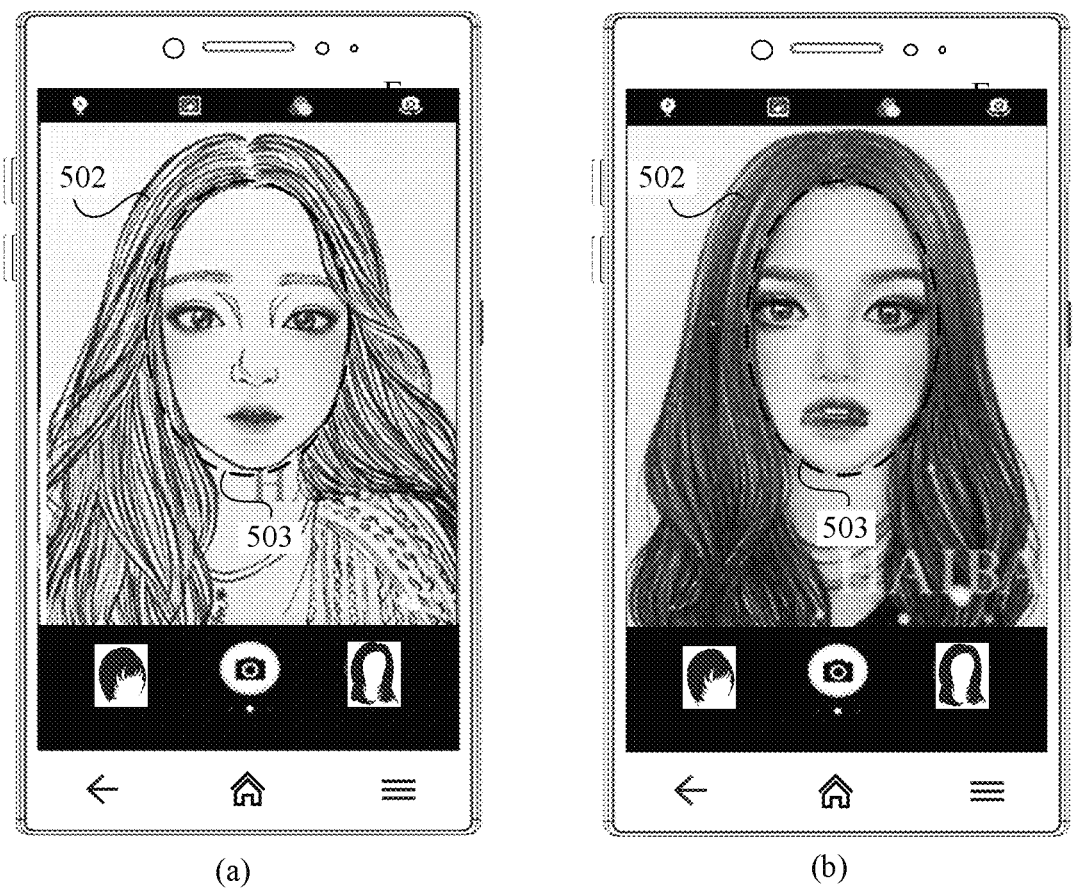
FIG. 20 is a schematic scenario diagram 15 of an image method according to an embodiment of this application.

Certainly, when the special hair style effect 502 is superimposed and displayed, the terminal may further adjust a position and a size of the special hair style effect 502 based on a position and a size of the human face in the associated region 503; or as shown in (a) of FIG. 20, the terminal may further change to a different special hair style effect 502 based on an emotion of the human face in the associated region 503, and change to a new special hair style effect 502 when detecting a frowning action in the associated region 503; or as shown in (b) of FIG. 20, the terminal may further adjust a color of the special hair style effect 502 based on a color of the human face in the associated region 503, so that both the special hair style effect 502 superimposed and displayed and the preview picture 501 can achieve relatively good display effects, to provide the user with substitutive interactive scene experience.

Certainly, there are a lot of other application scenarios for displaying a display element having a relatively strong association with the reference image. The scenarios are not described in detail in this embodiment of this application.

In addition, an example in which a fixed display element is superimposed and displayed in the foregoing embodiment is used to describe the displaying method provided by this embodiment of this application. In other embodiments of this application, the terminal may further automatically determine, based on an image recognition result of the reference image, a display element interactive with image content in the reference image, and properly lay out the display element on the reference image for superimposing and displaying.

Figure 21:
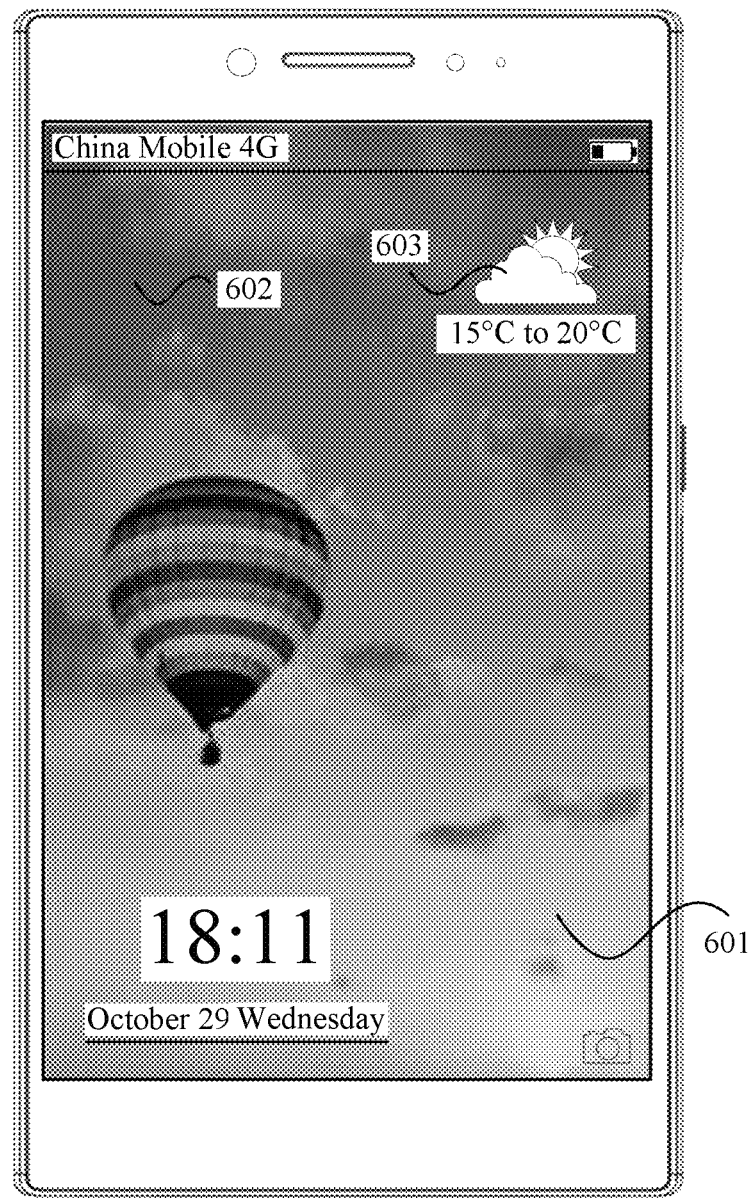
FIG. 21 is a schematic scenario diagram 16 of an image method according to an embodiment of this application.

For example, in an example in which the reference image is a lock screen interface 601 of the terminal, as shown in FIG. 21, the terminal may recognize, by using a preset image recognition algorithm, picture content included in the lock screen interface 601, for example, recognize a background element 602 including the sky in the lock screen interface 601. In this case, the terminal may obtain current weather information based on the sky background element 602, for example, obtain the current weather information "cloudy" from a weather application server. In this case, the terminal may determine, based on the weather information, that the display element that currently needs to be superimposed and displayed is a cloud icon 603 for indicating a current sunny weather, and further superimpose and display the cloud icon 603 on the lock screen interface 601.

Specifically, similarly to the displaying method shown in FIG. 2 to FIG. 12 in the foregoing embodiment, when the terminal superimposes and displays a sun icon 603 on the lock screen interface 601, the terminal may select, based on image features in the significant region and the insignificant region of the lock screen interface 601, a display position and a display form that have a relatively small visual conflict for the sun icon 603 for superimposing and displaying, so that both the reference image and the display element superimposed on the reference image can achieve relatively good display effects.

Figure 22:
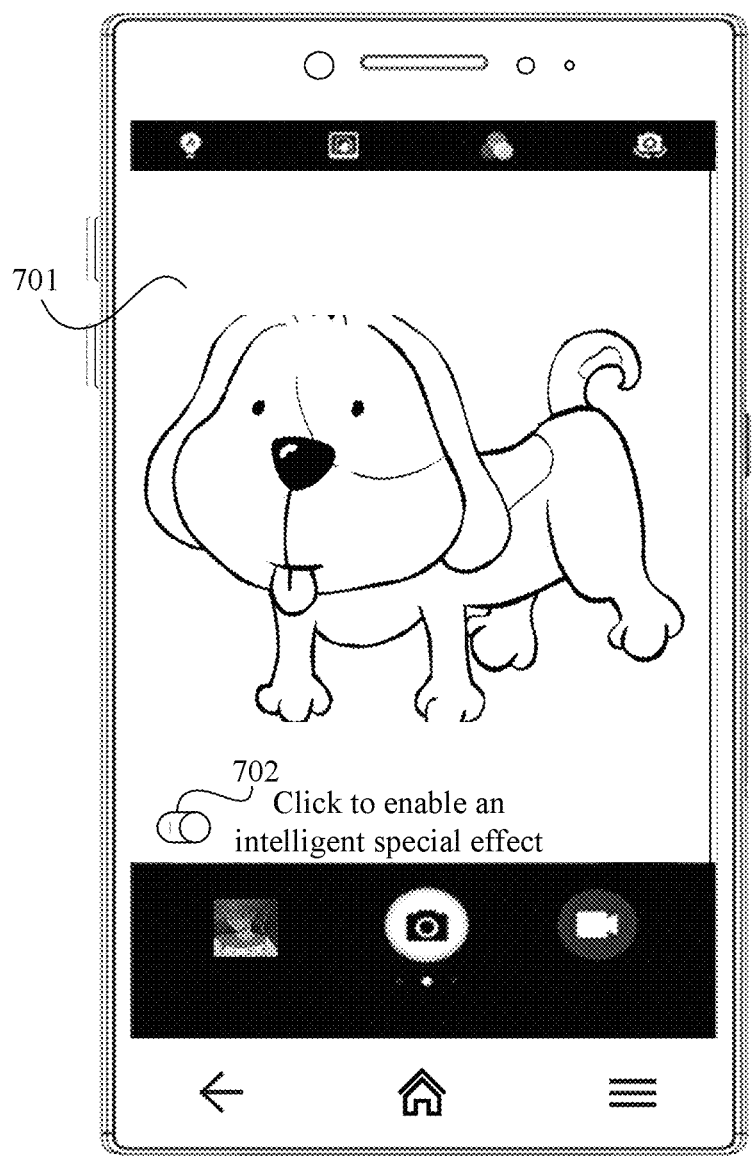
FIG. 22 is a schematic scenario diagram 17 of an image method according to an embodiment of this application.

Alternatively, as shown in FIG. 22, when the terminal starts the camera and enters a shooting preview mode, a control 702 for enabling intelligent matching of a special animation effect is superimposed and displayed in the currently displayed preview picture 701. Certainly, the displaying method provided in the foregoing embodiment may also be used when the control 702 is superimposed and displayed, and a display position and a display form that have a relatively small visual conflict (for example, avoiding a human face) are selected for the control 702 for superimposing and displaying.

Figure 23:
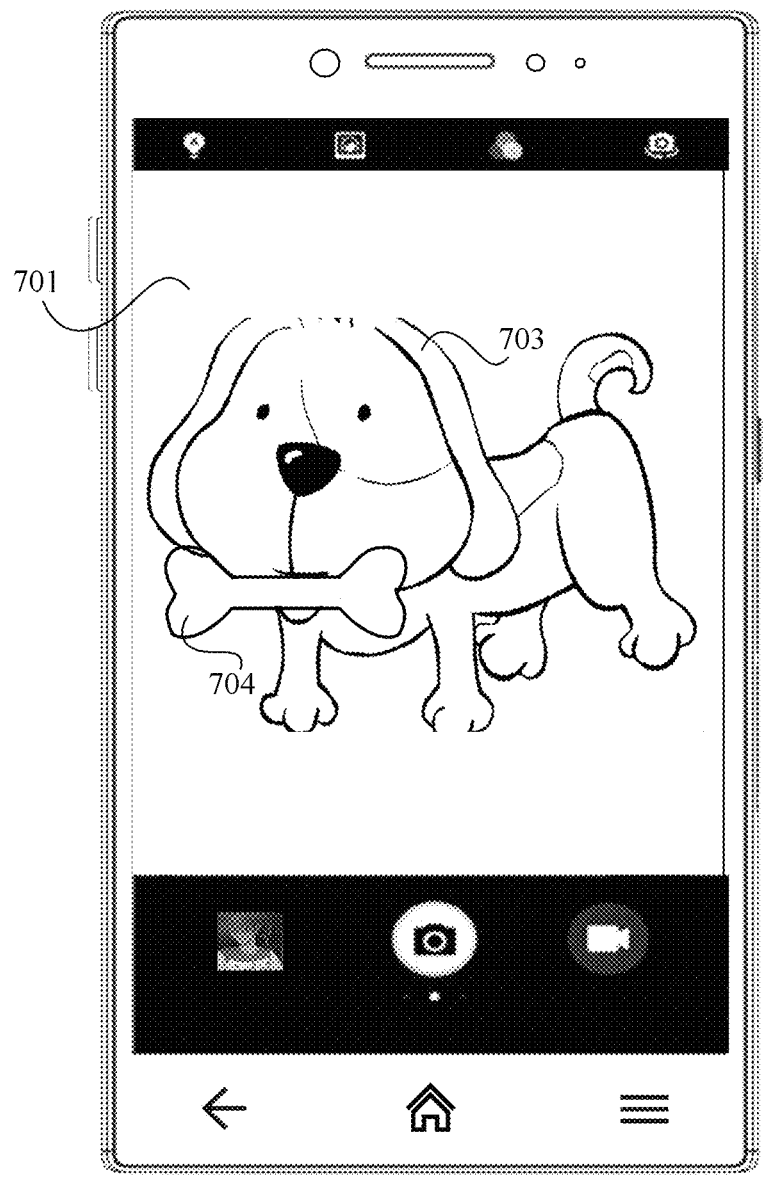
FIG. 23 is a schematic scenario diagram 18 of an image method according to an embodiment of this application.

In this case, after detecting that the user clicks the control 702 to enable the function of intelligently matching a special animation effect, the terminal may recognize, by using a preset image recognition algorithm, picture content included in the preview picture 701, for example, recognize that the preview picture 701 includes a dog 703. In this case, the terminal may further obtain, from a memory of the terminal or a cloud end, a display element associated with the dog 703. For example, the display element associated with the dog 703 is a special bone effect 704 shown in FIG. 23. Further, the terminal may superimpose and display the special bone effect 704 in the preview picture 701.

Specifically, because an association between the special bone effect 704 and the preview picture 701 is relatively strong, similarly to the displaying method in FIG. 17 to FIG. 20 in the foregoing embodiment, when superimposing and displaying the special bone effect 704 on the preview picture 701, the terminal may recognize an associated region (that is, a mouth part of the dog 703 in FIG. 23) having a relatively strong association with the special bone effect 704, and further superimpose and display the special bone effect 704 on the mouth part of the dog 703, to present an association relationship between the automatically generated special bone effect 704 and the preview picture 701.

It may be understood that, to implement the foregoing functions, the terminal includes corresponding hardware structures and/or software modules for performing the functions. A person skilled in the art should easily be aware that, in combination with the examples described in the embodiments disclosed in this specification, units, algorithms, and steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

In the embodiments of this application, functional modules in the terminal may be defined according to the foregoing method examples. For example, each functional module may be defined in a correspondence to each function, or two or more functions may be integrated in one processing module. The integrated module may be implemented in a form of hardware, or may be implemented in a form of a software functional module. It should be noted that, in this embodiment of this application, module division is an example, and is merely logical function division. In actual implementation, another division manner may be used.

Figure 24:
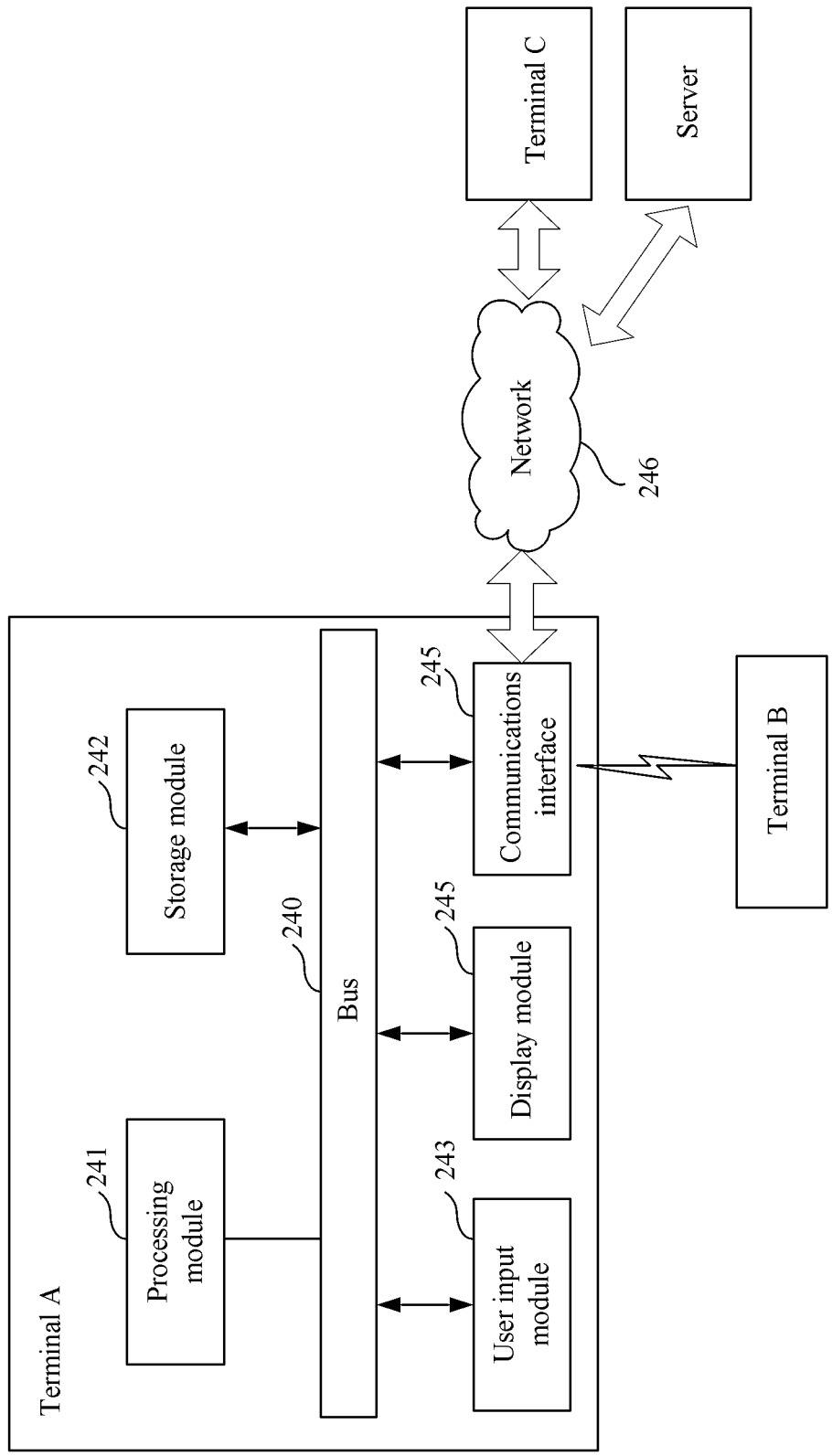
FIG. 24 is a schematic structural diagram 2 of a terminal according to an embodiment of this application.

For example, FIG. 24 is a schematic structural diagram of a terminal (using a terminal A as an example) in a division manner according to an embodiment of this application.

Referring to FIG. 24, a network environment 100 may include a terminal A, another terminal B, another terminal C, and a server. The terminal A may include a bus 240, a processing module 241, a storage module 242, a user input module 243, a display module 244, a communications interface 245, and other similar and/or appropriate components.

The bus 240 may be a circuit that interconnects the foregoing components and transfers communication (for example, a control message) between the foregoing components.

The processing module 241 may receive a command from the other components (for example, the storage module 242, the user input module 243, the display module 244, and the communications interface 245) by using the bus 240, and may interpret the received command, and may perform calculation or data processing based on the interpreted command.

The storage module 242 may store the command or data received from the processing module 241 or the other components (for example, the user input module 243, the display module 244, and the communications interface 245), or a command or data generated by the processing module 241 or the other components. The storage module 242 may include a programming module, where each of the programming module may be implemented by using software, firmware, hardware, or two or more thereof.

The user input module 243 may receive a command or data entered by a user by an input-output means (for example, a sensor, a keyboard, or a touchscreen), and may transfer the received command or data to the processing module 241 or the storage module 242 by using the bus 240. The display module 244 may display a video, an image, data, and the like to the user.

The display module 244 may display various information (for example, multimedia data and text data) received from the foregoing components.

The communications interface 245 may control a short-range communication connection with the another terminal B. When the terminal A is paired with another electronic device, the communications interface 245 may stop waiting for a scanning operation of receiving a signal from an adjacent electronic device or stop a broadcast operation of broadcasting a signal. For example, in response to pairing of the terminal A with the another terminal B, the communications interface 245 stops waiting for a scanning operation of receiving a signal from an adjacent electronic device or stops a broadcast operation of broadcasting a signal. When the terminal A is paired with another electronic device, the communications device 245 may control a period of the scanning or broadcasting operation.

In this embodiment of this application, the terminal A may use the communications interface 245 to communicate with another electronic device. For example, the communications interface 245 may communicate with the another terminal C, the server, and the like. The communications interface 245 may communicate with the another terminal C, the server, and the like directly or by using a network 246. For example, the communications interface 245 may connect the terminal A to the network 246.

In a possible implementation, the processing module 241 is a processor, the communications interface 245 is a radio frequency circuit, the storage module 242 is a memory, and the display module 244 is a display. In this case, the terminal A provided in this embodiment of this application may be specifically the mobile phone 100 shown in FIG. 1.

All or some of the foregoing embodiments may be implemented by means of software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive, Solid State Disk (SSD), or the like.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

The invention claimed is:

1. A method comprising:
    displaying a display element on a first desktop wallpaper, wherein the display element is an application icon of a first application, wherein the application icon comprises a foreground and a background, and wherein a background color of the background is based on a first color of the first desktop wallpaper;
    changing the first desktop wallpaper to a second desktop wallpaper; and
    adjusting the background color of the background according to a second color of the second desktop wallpaper,
    wherein a foreground color of the foreground and the background color of the background are different colors.

2. The method according to claim 1, wherein the method further comprises adjusting the foreground color according to the second color to generate an adjusted foreground color.

3. The method according to claim 2, wherein the foreground color of the foreground is the first color, and wherein the adjusted foreground highlight-color is the second color.

4. The method according to claim 1, further comprising:
    displaying a first lock screen wallpaper when a terminal is in a lock screen state; and
    displaying a first text on the first lock screen wallpaper, wherein a third color of the first text is based on a fourth color of the first lock screen wallpaper.

5. The method according to claim 4, further comprising:
    changing the first lock screen wallpaper to a second lock screen wallpaper; and
    adjusting the third color according to a fifth color of the second lock screen wallpaper.

6. A terminal comprising:
    one or more processors; and
    a memory coupled to the one or more processors and configured to store programming instructions that, when executed by the one or more processors, cause the terminal to:
        display a display element on a first desktop wallpaper, wherein the display element is an application icon of a first application, wherein the application icon comprises a foreground and a background, and wherein a background color of the background is based on a first color of the first desktop wallpaper;
        change the first desktop wallpaper to a second desktop wallpaper; and
        adjust the background color of the background according to a second color of the second desktop wallpaper,
        wherein a foreground color of the foreground and the background color of the background are different colors.

7. The terminal according to claim 6, wherein a the foreground color of the foreground is based on the first color, and wherein the programming instructions further cause the terminal to adjust the foreground color according to the second color to generate an adjusted foreground color.

8. The terminal according to claim 7, wherein the foreground color of the foreground is the first color, and wherein the adjusted foreground highlight color is the second color.

9. The terminal according to claim 6, wherein the programming instructions further cause the terminal to:
    display a first lock screen wallpaper when the terminal is in a lock screen state; and
    display a first text on the first lock screen wallpaper, wherein a third color of the first text is based on a fourth color of the first lock screen wallpaper.

10. The terminal according to claim 9, wherein the programming instructions further cause the terminal to:
    change the first lock screen wallpaper to a second lock screen wallpaper; and
    adjust the third color according to a fifth color of the second lock screen wallpaper.

11. A computer program product comprising computer-executable instructions that are stored on a non-transitory computer readable medium and that, when executed by one or more processors, cause a terminal to:
    display a display element on a first desktop wallpaper, wherein the display element is an application icon of a first application, wherein the application icon comprises a foreground and a background, and wherein a background color of the background is based on a first color of the first desktop wallpaper;
    change the first desktop wallpaper to a second desktop wallpaper; and
    adjust the background color of the background according to a second color of the second desktop wallpaper,
    wherein a foreground color of the foreground and the background color of the background are different colors.

12. The computer program product according to claim 11, wherein the computer-executable instructions, when executed by the one or more processors, further cause the terminal to:
    display a first lock screen wallpaper when the terminal is in a lock screen state; and
    display a first text on the first lock screen wallpaper, wherein a third color of the first text is based on a fourth color of the first lock screen wallpaper.

13. The computer program product according to claim 12, wherein the computer-executable instructions, when executed by the one or more processors, further cause the terminal to:
    change the first lock screen wallpaper to a second lock screen wallpaper; and
    adjust the third color according to a fifth color of the second lock screen wallpaper.

14. The method according to claim 2, further comprising gradually transitioning the foreground color of the foreground from the second color to a third color when the display element is moved from a first region to a second region, wherein the first region of the second desktop wallpaper has the second color, and wherein the second region of the second desktop wallpaper has the third color.

15. The terminal according to claim 7, wherein the programming instructions further cause the terminal to gradually transition the foreground color of the foreground from the second color to a third color when the display element is moved from a first region to a second region, wherein the first region of the second desktop wallpaper has the second color, and wherein the second region of the second desktop wallpaper has the third color.

16. A method comprising:
displaying a display element on a first desktop wallpaper, wherein the display element is an application icon of a first application, wherein the application icon comprises a foreground and a background, and wherein a foreground color of the foreground is based on a first color of the first desktop wallpaper;
changing the first desktop wallpaper to a second desktop wallpaper; and
adjusting the foreground color of the foreground according to a second color of the second desktop wallpaper, wherein the foreground color of the foreground and a background color of the background are different colors.

17. The method according to claim 16, wherein the background color of the background is based on the first color, and wherein the method further comprises adjusting the background color according to the second color to generate an adjusted background color.

18. The method according to claim 17, wherein the foreground color of the foreground is the first color, and wherein the adjusted foreground color is the second color.

19. The method according to claim 16, further comprising:
displaying a first lock screen wallpaper when a terminal is in a lock screen state; and
displaying a first text on the first lock screen wallpaper, wherein a third color of the first text is based on a fourth color of the first lock screen wallpaper.

20. The method according to claim 19, further comprising:
changing the first lock screen wallpaper to a second lock screen wallpaper; and
adjusting the third color according to a fifth color of the second lock screen wallpaper.

* * * * *

UNITED STATES PATENT AND TRADEMARK OFFICE
CERTIFICATE OF CORRECTION

PATENT NO. : 12,164,760 B2  
APPLICATION NO. : 18/330640  
DATED : December 10, 2024  
INVENTOR(S) : Hua Jiang, Xiaofeng Zhu and Xiaoxiao Chen Page 1 of 1

It is certified that error appears in the above-identified patent and that said Letters Patent is hereby corrected as shown below:

On the Title Page

Page 2, Item (56) References Cited, Foreign Patent Documents: "IN 104636045 A 5/2015" should read "CN 104636045 A 5/2015"

Signed and Sealed this
Twenty-eighth Day of January, 2025

Coke Morgan Stewart
*Acting Director of the United States Patent and Trademark Office*